(12) United States Patent
Pottker et al.

(10) Patent No.: US 11,827,835 B2
(45) Date of Patent: Nov. 28, 2023

(54) REFRIGERANT COMPOSITIONS AND USE THEREOF IN SYSTEMS USING FLOODED EVAPORATORS

(71) Applicant: HONEYWELL INTERNATIONAL INC., Charlotte, NC (US)

(72) Inventors: Gustavo Pottker, Charlotte, NC (US); Nilesh Purohit, Charlotte, NC (US); Samuel Yana Motta, Charlotte, NC (US); Kaimi Gao, Charlotte, NC (US); Ankit Sethi, Charlotte, NC (US); Ryan Hulse, Charlotte, NC (US)

(73) Assignee: HONEYWELL INTERNATIONAL INC.

( * ) Notice: Subject to any disclaimer, the term of this patent is extended or adjusted under 35 U.S.C. 154(b) by 51 days.

(21) Appl. No.: 17/518,769

(22) Filed: Nov. 4, 2021

(65) Prior Publication Data
US 2022/0169903 A1    Jun. 2, 2022

Related U.S. Application Data

(60) Provisional application No. 63/109,412, filed on Nov. 4, 2020.

(51) Int. Cl.
*C09K 5/04* (2006.01)
*F25B 45/00* (2006.01)

(52) U.S. Cl.
CPC .............. *C09K 5/045* (2013.01); *F25B 45/00* (2013.01); *C09K 2205/122* (2013.01); *C09K 2205/126* (2013.01); *C09K 2205/22* (2013.01); *C09K 2205/43* (2013.01)

(58) Field of Classification Search
CPC .............. C09K 5/045; C09K 2205/122; C09K 2205/126; C09K 2205/22; F25B 2339/0242; F25B 2400/121; F25B 2400/23; F25B 39/02
See application file for complete search history.

(56) References Cited

U.S. PATENT DOCUMENTS

| | | | |
|---|---|---|---|
| 2011/0252801 A1* | 10/2011 | Minor | C09K 23/017 60/645 |
| 2020/0354618 A1* | 11/2020 | Minor | C09K 3/30 |

FOREIGN PATENT DOCUMENTS

| | | | | |
|---|---|---|---|---|
| JP | 2022021660 A | * | 2/2022 | |
| WO | WO-2013032768 A1 | * | 3/2013 | .............. B65B 3/04 |
| WO | 2020223196 A1 | | 11/2020 | |

* cited by examiner

*Primary Examiner* — Kun Kai Ma
(74) *Attorney, Agent, or Firm* — Colleen D. Szuch

(57) ABSTRACT

Method for retrofitting an existing heat transfer system comprising adding to said existing system a refrigerant consisting essentially of: (i) from about 25% to about 45% by weight of 1,1,1,2-tetrafluoroethane (HFC-134a); (ii) from 25% to about 35% by weight of trans-1,3,3,3-tetrafluoropropene (HFO-1234ze(E)) and/or 2,3,3,3-tetrafluoropropene (HFO-1234yf); and (iii) from about 37% to about 46% by weight of a combination of difluoromethane (HFC-32) and pentafluoroethane (HFC-125), provided that the weight ratio of HFO-32:HFC-125 is from about 1.21:1 to about 0.8:1, wherein the refrigerant preferably is a non-flammable refrigerant having a GWP of 1350 or less.

22 Claims, 2 Drawing Sheets

REFRIGERANT COMPOSITIONS AND USE THEREOF IN SYSTEMS USING FLOODED EVAPORATORS

This invention relates to and claims the priority benefit of U.S. Provisional Application 63/109,412, filed Nov. 4, 2020.

FIELD OF THE INVENTION

This invention relates to refrigerant compositions useful for replacement and/or retrofit of ozone-depleting and/or global warming refrigerants, such as chlorodifluoromethane (R-22), for heating and cooling systems, especially in low and medium temperature refrigerant systems, which use a flooded evaporator, and to a process for retrofitting such systems which include a flooded evaporator and which contain R-22 refrigerant without the necessity for any significant modification of the refrigerant system's components or lubricants.

BACKGROUND

Mechanical refrigeration systems, and related heat transfer devices such as heat pumps and air conditioners, are well known in the art for industrial, commercial and domestic uses. Fluorocarbon based fluids have found widespread use in many residential, commercial and industrial applications, including as the working fluid in systems such as air conditioning, heat pump and refrigeration systems. Because of certain environmental problems, including the relatively high global warming potentials associated with the use of some of the compositions that have heretofore been used in these applications, it has become increasingly desirable to use fluids having low or even zero ozone depletion and global warming potentials, such as hydrofluorocarbons ("HFCs"). For example, a number of governments have signed the Kyoto Protocol to protect the global environment and setting forth a reduction of CO2 emissions (global warming). Thus, there is a need for a low- or non-flammable, non-toxic alternative to replace certain of high global warming HCFCs and HFCs.

Two important types of refrigeration systems are known as a "low temperature refrigeration systems" and "medium temperature refrigeration systems." Such systems are particularly important to the food manufacture, distribution and retail industries in that they play a vital role in ensuring that food which reaches the consumer is both fresh and fit to eat. In such low and medium temperature refrigeration systems, a commonly used refrigerant liquid has been R-22, which has a GWP of 1810. However, there are legislative and other pressures to not use refrigerants with a GWP of 1500. (see California Air Resources Board (CARB) proposed ban on sales of virgin refrigerants with a GWP above 1,500). Examples of refrigeration systems using flooded evaporators include ice rinks, commercial and industrial air conditioning, and commercial and industrial refrigeration such as process cooling, cold storage, and food processing, preparation and preservation by cooling or freezing. Previously disclosed replacements for R-22 have been studied and shown to result in a cooling capacity decrease of 36% and a power requirement increase of 14%, resulting in an overall coefficient of performance (COP) reduction of 44%. (See WO2020/223196A1).

There has thus been an increasing need for new fluorocarbon and hydrofluorocarbon compounds and compositions that are attractive alternatives to the compositions heretofore used in these and other applications. For example, it has become desirable to retrofit chlorine-containing refrigeration systems by replacing chlorine-containing refrigerants with non-chlorine-containing refrigerant compounds that will not deplete the ozone layer, such as hydrofluorocarbons (HFC's). Industry in general and the heat transfer industry in particular are continually seeking new fluorocarbon based mixtures that offer alternatives to, and are considered environmentally safer substitutes for, CFCs and HCFCs. It is generally considered important, however, at least with respect to heat transfer fluids, that any potential new refrigerant that can be used to retrofit an existing system to have excellent heat transfer properties, chemical stability, low- or no-toxicity, non-flammability and/or lubricant compatibility, among others.

It is generally considered either important or essential in many applications, including particularly in many low and medium temperature heat transfer applications, to use compositions which are non-flammable. As used herein, the term "nonflammable" refers to compounds or compositions which are determined to be nonflammable as determined in accordance with ASTM standard E-681, dated 2002, which is incorporated herein by reference. Unfortunately, many HFC's which might otherwise be desirable for used to retrofit existing refrigeration systems are not nonflammable as that term is used herein. For example, the fluoroalkane difluoroethane (HFC-152a) and the fluoroalkene 1,1,1-trifluorpropene (HFO-1243zf) are each flammable and therefore not viable for use in many applications.

With regard to efficiency in use, it is important to note that a loss in refrigerant thermodynamic performance or energy efficiency may have secondary environmental impacts through increased fossil fuel usage arising from an increased demand for electrical energy.

Furthermore, it is generally considered desirably for CFC refrigerant substitutes to be effective without major engineering changes to conventional vapor compression technology currently used with CFC refrigerants. However, the ability to achieve this result is especially difficult for prior systems which used flooded evaporators, as explained in detail hereinafter.

Applicants have thus come to appreciate a need for compositions, and particularly heat transfer compositions, that are highly advantageous in heating and cooling systems and methods, particularly in methods of retrofitting existing vapor compression heating and cooling systems, and even more particularly low and medium temperature refrigerant systems, that have used a flooded evaporator, including existing systems which contain and/or have been used with existing refrigerant R-22, R-404A (GWP=3922) or R507A (GWP=3985). In this regard it should be noted that certain industry standards/preferences specify that the power consumption of retrofit, including R-22 retrofits, should not exceed about 110% compared to the power usage with the refrigerant being replaced.

SUMMARY

Applicants have found that the above-noted needs, and other needs, can be satisfied by methods for retrofitting an existing heat transfer system selected from refrigerant systems, air conditioning systems and chiller systems, said method comprising:
(a) providing an existing vapor compression system comprising:
(i) a refrigerant in the system, said refrigerant being selected from the group consisting of R-22, R404A, and R507A;

(ii) a compressor having a compressor inlet receiving refrigerant vapor at a first pressure and a compressor outlet discharging refrigerant vapor at second pressure higher than said first pressure;

(iii) a condenser which receives said refrigerant vapor discharged from said compressor and which transfers heat out of said refrigerant vapor to produce liquid refrigerant;

(iv) a pressure reducer which receives liquid refrigerant from said condenser and produces a mixture of liquid refrigerant and refrigerant vapor at a pressure below said second pressure;

(v) optionally an accumulator which receives said mixture from said pressure reducer, separates said refrigerant vapor from said liquid refrigerant, and produces a liquid refrigerant stream and a refrigerant vapor stream, wherein said refrigerant vapor from said accumulator feeds said compressor inlet;

(vi) a flooded evaporator receiving: (1) said mixture of liquid refrigerant and refrigerant vapor from said pressure reducer; and/or (2) said liquid refrigerant stream from said accumulator when present, wherein said flooded evaporator produces refrigerant vapor feeding: (1) said compressor inlet; and/or (2) said accumulator when present;

(b) removing at least a substantial portion of the existing refrigerant from the existing vapor compression system; and (c) after said removing step, adding to said existing system a refrigerant consisting essentially of:

(i) from about 25% to about 45% by weight of 1,1,1,2-tetrafluoroethane (HFC-134a);

(ii) from 25% to about 35% by weight of trans-1,3,3,3-tetrafluoropropene (HFO-1234ze(E)) and/or 2,3,3,3-tetrafluoropropene (HFO-1234yf); and (iii) from about 37% to about 46% by weight of a combination of difluoromethane (HFC-32) and pentafluoroethane (HFC-125), provided that the weight ratio of HFO-32:HFC-125 is from about 1.21:1 to about 0.8:1, and further provided that said refrigerant is a non-flammable refrigerant and that said refrigerant has a GWP of 1500 or less, wherein said refrigerant has a compressor power consumption that is about 110% or less than the power consumption of R-22 in said system.

For the purposes of convenience, compositions according to the present paragraph are referred to herein as Retrofit Methods 1.

The present invention also provided methods for retrofitting an existing heat transfer system selected from refrigerant systems, air conditioning systems and chiller systems, said method comprising:

(a) providing an existing vapor compression system comprising:

(i) a refrigerant in the system, said refrigerant being selected from the group consisting of R-22, R404A, and R507A;

(ii) a compressor having a compressor inlet receiving refrigerant vapor at a first pressure and a compressor outlet discharging refrigerant vapor at second pressure higher than said first pressure;

(iii) a condenser which receives said refrigerant vapor discharged from said compressor and which transfers heat out of said refrigerant vapor to produce liquid refrigerant;

(iv) a pressure reducer which receives liquid refrigerant from said condenser and produces a mixture of liquid and vaporous refrigerant at a pressure below said second pressure;

(v) optionally an accumulator which receives said mixture from said pressure reducer, separates said refrigerant vapor from said liquid refrigerant, and produces a liquid refrigerant stream and a refrigerant vapor stream, wherein said refrigerant vapor stream from said accumulator feeds said inlet of said compressor;

(vi) a flooded evaporator receiving: (1) said mixture of liquid refrigerant and refrigerant vapor from said pressure reducer; and/or (2) said liquid refrigerant stream from said accumulator when present, wherein said flooded evaporator produces refrigerant vapor feeding: (1) the inlet of said compressor; and/or (2) said accumulator when present;

(b) removing at least a substantial portion of the existing refrigerant from the existing vapor compression system; and (c) after said removing step, adding to said existing system a refrigerant consisting essentially of:

(i) from about 30% to about 45% by weight of 1,1,1,2-tetrafluoroethane (HFC-134a);

(ii) from 25% to about 35% by weight of a combination of trans-1,3,3,3-tetrafluoropropene (HFO-1234ze (E)) and 2,3,3,3-tetrafluoropropene (HFO-1234yf), provided that the weight ratio of HFO-1234yf:HFO-1234ze(E) is from about 5:1 to about 2:1; and (iii) from about 40% to about 46% by weight of a combination of difluoromethane (HFC-32) and pentafluoroethane (HFC-125), provided that the weight ratio of HFO-32:HFC-125 is from about 1.21:1 to about 0.8:1, and further provided that said refrigerant is a non-flammable refrigerant and that said refrigerant has a GWP of 1500 or less, wherein said refrigerant has a compressor power consumption that is 115% or less than the power consumption of R-22 in said system.

For the purposes of convenience, compositions according to the present paragraph are referred to herein as Retrofit Methods 2.

The present invention also provided methods for retrofitting an existing heat transfer system selected from refrigerant systems, air conditioning systems and chiller systems, said method comprising:

(a) providing an existing vapor compression system comprising:

(i) a refrigerant in the system, said refrigerant being selected from the group consisting of R-22, R404A, and R507A;

(ii) a compressor having a compressor inlet receiving refrigerant vapor at a first pressure and a compressor outlet discharging refrigerant vapor at second pressure higher than said first pressure;

(iii) a condenser which receives said refrigerant vapor discharged from said compressor and which transfers heat out of said refrigerant vapor to produce liquid refrigerant;

(iv) a pressure reducer which receives liquid refrigerant from said condenser and produces a mixture of liquid and vaporous refrigerant at a pressure below said second pressure;

(v) optionally an accumulator which receives said mixture from said pressure reducer, separates said refrigerant vapor from said liquid refrigerant, and produces a liquid refrigerant stream and a refrigerant vapor stream, wherein said refrigerant vapor stream from said accumulator feeds said inlet of said compressor;

(vi) a flooded evaporator receiving: (1) said mixture of liquid refrigerant and refrigerant vapor from said pressure reducer; and/or (2) said liquid refrigerant stream from said accumulator when present, wherein said flooded evaporator produces refrigerant vapor feeding: (1) the inlet of said compressor; and/or (2) said accumulator when present;

(b) removing at least a substantial portion of the existing refrigerant from the existing vapor compression system; and (c) after said removing step, adding to said existing system a refrigerant consisting essentially of:
  (i) about 31% by weight of 1,1,1,2-tetrafluoroethane (HFC-134a);
  (ii) about 27% by weight of a combination of trans-1,3,3,3-tetrafluoropropene (HFO-1234ze(E)) and 2,3,3,3-tetrafluoropropene (HFO-1234yf), provided that the weight ratio of HFO-1234yf:HFO-1234ze(E) is from about 5:1 to about 2:1; and
  (iii) about 42% by weight of a combination of difluoromethane (HFC-32) and pentafluoroethane (HFC-125), provided that the weight ratio of HFO-32:HFC-125 is from about 1.21:1 to about 0.8:1,
and further provided that said refrigerant is a non-flammable refrigerant and that said refrigerant has a GWP of 1500 or less, wherein said refrigerant has a compressor power consumption that is 110% or less than the power consumption of R-22 in said system. For the purposes of convenience, compositions according to the present paragraph are referred to herein as Retrofit Methods 3.

The present invention also provided methods for retrofitting an existing heat transfer system selected from refrigerant systems, air conditioning systems and chiller systems, said method comprising:

(a) providing an existing vapor compression system comprising:
  (i) a refrigerant in the system, said refrigerant being selected from the group consisting of R-22, R404A, and R507A;
  (ii) a compressor having a compressor inlet receiving refrigerant vapor at a first pressure and a compressor outlet discharging refrigerant vapor at second pressure higher than said first pressure;
  (iii) a condenser which receives said refrigerant vapor discharged from said compressor and which transfers heat out of said refrigerant vapor to produce liquid refrigerant;
  (iv) a pressure reducer which receives liquid refrigerant from said condenser and produces a mixture of liquid and vaporous refrigerant at a pressure below said second pressure;
  (v) optionally an accumulator which receives said mixture from said pressure reducer, separates said refrigerant vapor from said liquid refrigerant, and produces a liquid refrigerant stream and a refrigerant vapor stream, wherein said refrigerant vapor stream from said accumulator feeds said inlet of said compressor;
  (vi) a flooded evaporator receiving: (1) said mixture of liquid refrigerant and refrigerant vapor from said pressure reducer; and/or (2) said liquid refrigerant stream from said accumulator when present, wherein said flooded evaporator produces refrigerant vapor feeding: (1) the inlet of said compressor; and/or (2) said accumulator when present;

(b) removing at least a substantial portion of the existing refrigerant from the existing vapor compression system; and (c) after said removing step, adding to said existing system a refrigerant consisting essentially of:
  (i) about 25 to about 31% by weight of 1,1,1,2-tetrafluoroethane (HFC-134a);
  (iia) about 7% to about 20% by weight of trans-1,3,3,3-tetrafluoropropene (HFO-1234ze(E));
  (iib) about 11% to about 20% by weight of HFO-1234yf;
  (iiia) about 22% by weight of difluoromethane (HFC-32); and
  (iiib) about 22% by weight of pentafluoroethane (HFC-125), provided that said refrigerant is a non-flammable refrigerant and that said refrigerant has a GWP of 1500 or less, wherein said refrigerant has a compressor power consumption that is 110% or less than the power consumption of R-22 in said system. For the purposes of convenience, compositions according to the present paragraph are referred to herein as Retrofit Methods 4.

The present invention also provided methods for retrofitting an existing heat transfer system selected from refrigerant systems, air conditioning systems and chiller systems, said method comprising:

(a) providing an existing vapor compression system comprising:
  (i) a refrigerant in the system, said refrigerant being selected from the group consisting of R-22, R404A, and R507A;
  (ii) a compressor having a compressor inlet receiving refrigerant vapor at a first pressure and a compressor outlet discharging refrigerant vapor at second pressure higher than said first pressure;
  (iii) a condenser which receives said refrigerant vapor discharged from said compressor and which transfers heat out of said refrigerant vapor to produce liquid refrigerant;
  (iv) a pressure reducer which receives liquid refrigerant from said condenser and produces a mixture of liquid and vaporous refrigerant at a pressure below said second pressure;
  (v) optionally an accumulator which receives said mixture from said pressure reducer, separates said refrigerant vapor from said liquid refrigerant, and produces a liquid refrigerant stream and a refrigerant vapor stream, wherein said refrigerant vapor stream from said accumulator feeds said inlet of said compressor;
  (vi) a flooded evaporator receiving: (1) said mixture of liquid refrigerant and refrigerant vapor from said pressure reducer; and/or (2) said liquid refrigerant stream from said accumulator when present, wherein said flooded evaporator produces refrigerant vapor feeding: (1) the inlet of said compressor; and/or (2) said accumulator when present;

(b) removing at least a substantial portion of the existing refrigerant from the existing vapor compression system; and (c) after said removing step, adding to said existing system a refrigerant consisting essentially of:
  (i) about 29% by weight of 1,1,1,2-tetrafluoroethane (HFC-134a);

(ii) about 31% by weight of 2,3,3,3-tetrafluoropropene (HFO-1234yf),
(iii) about 20% by weight of difluoromethane (HFC-32); and
(iv) about 20% by weight of pentafluoroethane (HFC-125), further provided that said refrigerant is a non-flammable refrigerant and that said refrigerant has a GWP of 1500 or less, wherein said refrigerant has a compressor power consumption that is 115% or less than the power consumption of R-22 in said system. For the purposes of convenience, compositions according to the present paragraph are referred to herein as Retrofit Methods 5.

The present invention also provided methods for retrofitting an existing heat transfer system selected from refrigerant systems, air conditioning systems and chiller systems, said method comprising:

(a) providing an existing vapor compression system comprising:
  (i) a refrigerant in the system, said refrigerant being selected from the group consisting of R-22, R404A, and R507A;
  (ii) a compressor having a compressor inlet receiving refrigerant vapor at a first pressure and a compressor outlet discharging refrigerant vapor at second pressure higher than said first pressure;
  (iii) a condenser which receives said refrigerant vapor discharged from said compressor and which transfers heat out of said refrigerant vapor to produce liquid refrigerant;
  (iv) a pressure reducer which receives liquid refrigerant from said condenser and produces a mixture of liquid and vaporous refrigerant at a pressure below said second pressure;
  (v) optionally an accumulator which receives said mixture from said pressure reducer, separates said refrigerant vapor from said liquid refrigerant, and produces a liquid refrigerant stream and a refrigerant vapor stream, wherein said refrigerant vapor stream from said accumulator feeds said inlet of said compressor;
  (vi) a flooded evaporator receiving: (1) said mixture of liquid refrigerant and refrigerant vapor from said pressure reducer; and/or (2) said liquid refrigerant stream from said accumulator when present, wherein said flooded evaporator produces refrigerant vapor feeding: (1) the inlet of said compressor; and/or (2) said accumulator when present;
(b) removing at least a substantial portion of the existing refrigerant from the existing vapor compression system; and
(c) after said removing step, adding to said existing system a refrigerant consisting essentially of:
  (i) about 25% to about 31% by weight of 1,1,1,2-tetrafluoroethane (HFC-134a);
  (ii) from 27% to about 32% by weight of a combination of trans-1,3,3,3-tetrafluoropropene (HFO-1234ze(E)) and optionally 2,3,3,3-tetrafluoropropene (HFO-1234yf), provided that the refrigerant comprises at least 6.5% by weight of 1234ze(E); and
  (iii) about 22% by weight of difluoromethane (HFC-32); and
  (iiib) about 22% by weight of pentafluoroethane (HFC-125), provided that said refrigerant is a non-flammable refrigerant and that said refrigerant has a GWP of 1500 or less, wherein said refrigerant has a compressor power consumption that is about 110% or less than the power consumption of R-22 in said system.

For the purposes of convenience, compositions according to the present paragraph are referred to herein as Retrofit Methods 6.

The present invention also provided methods for retrofitting an existing heat transfer system selected from refrigerant systems, air conditioning systems and chiller systems, said method comprising:

(a) providing an existing vapor compression system comprising:
  (i) a refrigerant in the system, said refrigerant being selected from the group consisting of R-22, R404A, and R507A;
  (ii) a compressor having a compressor inlet receiving refrigerant vapor at a first pressure and a compressor outlet discharging refrigerant vapor at second pressure higher than said first pressure;
  (iii) a condenser which receives said refrigerant vapor discharged from said compressor and which transfers heat out of said refrigerant vapor to produce liquid refrigerant;
  (iv) a pressure reducer which receives liquid refrigerant from said condenser and produces a mixture of liquid and vaporous refrigerant at a pressure below said second pressure;
  (v) optionally an accumulator which receives said mixture from said pressure reducer, separates said refrigerant vapor from said liquid refrigerant, and produces a liquid refrigerant stream and a refrigerant vapor stream, wherein said refrigerant vapor stream from said accumulator feeds said inlet of said compressor;
  (vi) a flooded evaporator receiving: (1) said mixture of liquid refrigerant and refrigerant vapor from said pressure reducer; and/or (2) said liquid refrigerant stream from said accumulator when present, wherein said flooded evaporator produces refrigerant vapor feeding: (1) the inlet of said compressor; and/or (2) said accumulator when present;
(b) removing at least a substantial portion of the existing refrigerant from the existing vapor compression system; and
(c) after said removing step, adding to said existing system a refrigerant consisting essentially of:
  (i) about 31% by weight of 1,1,1,2-tetrafluoroethane (HFC-134a);
  (ii) about 7% by weight of trans-1,3,3,3-tetrafluoropropene (HFO-1234ze(E));
  (iii) about 20% by weight of 2,3,3,3-tetrafluoropropene (HFO-1234yf);
  (iv) about 21% by weight of difluoromethane (HFC-32); and
  (v) about 21% by weight of pentafluoroethane (HFC-125), wherein said refrigerant has a compressor power consumption that is about 110% or less than the power consumption of R-22 in said system.

For the purposes of convenience, compositions according to the present paragraph are referred to herein as Retrofit Methods 6A.

The present invention also provided methods for retrofitting an existing heat transfer system selected from refrigerant systems, air conditioning systems and chiller systems, said method comprising:

(a) providing an existing vapor compression system comprising:

(i) a refrigerant in the system, said refrigerant being selected from the group consisting of R-22, R404A, and R507A;
(ii) a compressor having a compressor inlet receiving refrigerant vapor at a first pressure and a compressor outlet discharging refrigerant vapor at second pressure higher than said first pressure;
(iii) a condenser which receives said refrigerant vapor discharged from said compressor and which transfers heat out of said refrigerant vapor to produce liquid refrigerant;
(iv) a pressure reducer which receives liquid refrigerant from said condenser and produces a mixture of liquid and vaporous refrigerant at a pressure below said second pressure;
(v) optionally an accumulator which receives said mixture from said pressure reducer, separates said refrigerant vapor from said liquid refrigerant, and produces a liquid refrigerant stream and a refrigerant vapor stream, wherein said refrigerant vapor stream from said accumulator feeds said inlet of said compressor;
(vi) a flooded evaporator receiving: (1) said mixture of liquid refrigerant and refrigerant vapor from said pressure reducer; and/or (2) said liquid refrigerant stream from said accumulator when present, wherein said flooded evaporator produces refrigerant vapor feeding: (1) the inlet of said compressor; and/or (2) said accumulator when present;
(b) removing at least a substantial portion of the existing refrigerant from the existing vapor compression system; and
(c) after said removing step, adding to said existing system a refrigerant consisting essentially of:
(i) about 26% by weight of 1,1,1,2-tetrafluoroethane (HFC-134a);
(ii) about 14% by weight of trans-1,3,3,3-tetrafluoropropene (HFO-1234ze(E));
(iii) about 18% by weight of 2,3,3,3-tetrafluoropropene (HFO-1234yf);
(iv) about 21% by weight of difluoromethane (HFC-32); and
(v) about 21% by weight of pentafluoroethane (HFC-125), wherein said refrigerant has a compressor power consumption that is about 110% or less than the power consumption of R-22 in said system.

For the purposes of convenience, compositions according to the present paragraph are referred to herein as Retrofit Methods 6B.

The present invention also provided methods for retrofitting an existing heat transfer system selected from refrigerant systems, air conditioning systems and chiller systems, said method comprising:
(a) providing an existing vapor compression system comprising:
(i) a refrigerant in the system, said refrigerant being selected from the group consisting of R-22, R404A, and R507A;
(ii) a compressor having a compressor inlet receiving refrigerant vapor at a first pressure and a compressor outlet discharging refrigerant vapor at second pressure higher than said first pressure;
(iii) a condenser which receives said refrigerant vapor discharged from said compressor and which transfers heat out of said refrigerant vapor to produce liquid refrigerant;
(iv) a pressure reducer which receives liquid refrigerant from said condenser and produces a mixture of liquid and vaporous refrigerant at a pressure below said second pressure;
(v) optionally an accumulator which receives said mixture from said pressure reducer, separates said refrigerant vapor from said liquid refrigerant, and produces a liquid refrigerant stream and a refrigerant vapor stream, wherein said refrigerant vapor stream from said accumulator feeds said inlet of said compressor;
(vi) a flooded evaporator receiving: (1) said mixture of liquid refrigerant and refrigerant vapor from said pressure reducer; and/or (2) said liquid refrigerant stream from said accumulator when present, wherein said flooded evaporator produces refrigerant vapor feeding: (1) the inlet of said compressor; and/or (2) said accumulator when present;
(b) removing at least a substantial portion of the existing refrigerant from the existing vapor compression system; and
(c) after said removing step, adding to said existing system a refrigerant consisting essentially of:
(i) about 25% by weight of 1,1,1,2-tetrafluoroethane (HFC-134a);
(ii) about 20% by weight of trans-1,3,3,3-tetrafluoropropene (HFO-1234ze(E));
(iii) about 11% by weight of 2,3,3,3-tetrafluoropropene (HFO-1234yf);
(iv) about 22% by weight of difluoromethane (HFC-32); and
(v) about 22% by weight of pentafluoroethane (HFC-125), wherein said refrigerant has a compressor power consumption that is about 110% or less than the power consumption of R-22 in said system.

For the purposes of convenience, compositions according to the present paragraph are referred to herein as Retrofit Methods 6C.

The present invention also provided methods for retrofitting an existing heat transfer system selected from refrigerant systems, air conditioning systems and chiller systems, said method comprising:
(a) providing an existing vapor compression system comprising:
(i) a refrigerant in the system, said refrigerant being selected from the group consisting of R-22, R404A, and R507A;
(ii) a compressor having a compressor inlet receiving refrigerant vapor at a first pressure and a compressor outlet discharging refrigerant vapor at second pressure higher than said first pressure;
(iii) a condenser which receives said refrigerant vapor discharged from said compressor and which transfers heat out of said refrigerant vapor to produce liquid refrigerant;
(iv) a pressure reducer which receives liquid refrigerant from said condenser and produces a mixture of liquid and vaporous refrigerant at a pressure below said second pressure;
(v) optionally an accumulator which receives said mixture from said pressure reducer, separates said refrigerant vapor from said liquid refrigerant, and produces a liquid refrigerant stream and a refrigerant vapor stream, wherein said refrigerant vapor stream from said accumulator feeds said inlet of said compressor;

(vi) a flooded evaporator receiving: (1) said mixture of liquid refrigerant and refrigerant vapor from said pressure reducer; and/or (2) said liquid refrigerant stream from said accumulator when present, wherein said flooded evaporator produces refrigerant vapor feeding: (1) the inlet of said compressor; and/or (2) said accumulator when present;

(b) removing at least a substantial portion of the existing refrigerant from the existing vapor compression system; and (c) after said removing step, adding to said existing system a refrigerant consisting essentially of:
(i) about 25% by weight of 1,1,1,2-tetrafluoroethane (HFC-134a);
(ii) about 29% by weight of trans-1,3,3,3-tetrafluoropropene (HFO-1234ze(E));
(iii) about 23% by weight of difluoromethane (HFC-32); and
(v) about 23% by weight of pentafluoroethane (HFC-125), wherein said refrigerant has a compressor power consumption that is about 110% or less than the power consumption of R-22 in said system.

For the purposes of convenience, compositions according to the present paragraph are referred to herein as Retrofit Methods 6D.

The present invention provides also methods for retrofitting an existing refrigeration system, including each of Retrofit Methods 1 and Retrofit Methods 2, wherein said refrigerant of said adding step comprises from about 35% to about 42% by weight of 1,1,1,2-tetrafluoroethane (HFC-134a). For the purposes of convenience, compositions according to the present paragraph are referred to herein as Retrofit Methods 7.

The present invention provides also methods for retrofitting an existing refrigeration system, including each of Retrofit Methods 1, Retrofit Methods 2 and Retrofit Methods 7, wherein said refrigerant of said adding step comprises from about 40% to about 42% by weight of said combination of difluoromethane (HFC-32) and pentafluoroethane (HFC-125). For the purposes of convenience, compositions according to the present paragraph are referred to herein as Retrofit Methods 8.

The present invention provides also methods for retrofitting an existing refrigeration system, including each of Retrofit Methods 1-8, wherein after said adding step (b) said system operates with a capacity in said system that is at least 90% of the capacity of R-22 in said system. For the purposes of convenience, methods according to this paragraph are sometimes referred to herein as Retrofit Methods 9.

The present invention provides also methods for retrofitting an existing refrigeration system, including each of Retrofit Methods 1-8, wherein after said adding step (b) said system operates with a capacity in said system that is at least 94% of the capacity of R-22 in said system. For the purposes of convenience, methods according to this paragraph are sometimes referred to herein as Retrofit Methods 10.

The present invention provides also methods for retrofitting an existing refrigeration system, including each of Retrofit Methods 1-8, wherein after said adding step (b) said system operates with a capacity in said system that is at least 95% of the capacity of R-22 in said system. For the purposes of convenience, methods according to this paragraph are sometimes referred to herein as Retrofit Methods 11.

The present invention provides also methods for retrofitting an existing refrigeration system, including each of Retrofit Methods 1-11, wherein after said adding step (b) said system operates with a compressor discharge pressure that is not more than 122% of the discharge pressure of said R-22 in said system. For the purposes of convenience, methods according to this paragraph are sometimes referred to herein as Retrofit Method 12.

The present invention provides also methods for retrofitting an existing refrigeration system, including each of Retrofit Methods 1-11, wherein after said adding step (b) said system operates with a compressor discharge pressure that is not more than 120% of the discharge pressure of said R-22 in said system. For the purposes of convenience, methods according to this paragraph are sometimes referred to herein as Retrofit Method 13.

The present invention provides also methods for retrofitting an existing refrigeration system, including each of Retrofit Methods 1-11, wherein after said adding step (b) said system operates with a compressor discharge pressure that is not more than 117% of the discharge pressure of said R-22 in said system. For the purposes of convenience, methods according to this paragraph are sometimes referred to herein as Retrofit Method 14.

The present invention provides also methods for retrofitting an existing refrigeration system, including each of Retrofit Methods 1-14, wherein after said adding step (b) said system operates with a refrigerant mass flow rate that is not more than 105% of the mass flow rated of said R-22 in said system. For the purposes of convenience, methods according to this paragraph are sometimes referred to herein as Retrofit Method 15.

The present invention provides also methods for retrofitting an existing refrigeration system, including each of Retrofit Methods 1-14, wherein after said adding step (b) said system operates with a refrigerant mass flow rate that is not more than 102% of the mass flow rated of said R-22 in said system. For the purposes of convenience, methods according to this paragraph are sometimes referred to herein as Retrofit Method 16.

The present invention provides also methods for retrofitting an existing refrigeration system, including each of Retrofit Methods 1-14, wherein after said adding step (b) said system operates with a refrigerant mass flow rate that is equal to or less than 101% of the mass flow rated of said R-22 in said system. For the purposes of convenience, methods according to this paragraph are sometimes referred to herein as Retrofit Method 17.

The present invention provides also methods for retrofitting an existing refrigeration system, including each of Retrofit Methods 1-17, wherein after said adding step (b) said system operates with an evaporator glide of 3.5° C. For the purposes of convenience, methods according to this paragraph are sometimes referred to herein as Retrofit Methods 18.

The present invention provides also methods for retrofitting an existing refrigeration system, including each of Retrofit Methods 1-17, wherein said accumulator is present in the system. For the purposes of convenience, methods according to this paragraph are sometimes referred to herein as Retrofit Methods 19.

The present invention provides also methods for retrofitting an existing refrigeration system, including each of Retrofit Methods 1-19, wherein said existing system further comprises a subcooler for subcooling the liquid from said condenser. For the purposes of convenience, methods according to this paragraph are sometimes referred to herein as Retrofit Methods 20.

The present invention provides also methods for retrofitting an existing refrigeration system, including each of Retrofit Methods 1-19, wherein said existing system further comprises a subcooler internal to said condenser for subcooling the liquid exiting from said condenser. For the purposes of convenience, methods according to this paragraph are sometimes referred to herein as Retrofit Methods 21.

The present invention provides also methods for retrofitting an existing refrigeration system, including each of Retrofit Methods 1-21, wherein said existing system further comprises a subcooler external to said condenser for subcooling the liquid exiting from said condenser. For the purposes of convenience, methods according to this paragraph are sometimes referred to herein as Retrofit Methods 22.

The present invention provides also methods for retrofitting an existing refrigeration system, including each of Retrofit Methods 1-22, wherein said existing refrigerant is R-22. For the purposes of convenience, methods according to this paragraph are sometimes referred to herein as Retrofit Methods 23.

The present invention provides also methods for retrofitting an existing refrigeration system, including each of Retrofit Methods 1-22, wherein said existing refrigerant is R-507A. For the purposes of convenience, methods according to this paragraph are sometimes referred to herein as Retrofit Methods 24.

The present invention provides also methods for retrofitting an existing refrigeration system, including each of Retrofit Methods 1-22, wherein said existing refrigerant is R-404A. For the purposes of convenience, methods according to this paragraph are sometimes referred to herein as Retrofit Methods 25.

The present invention provides also methods for retrofitting an existing refrigeration system, including each of Retrofit Methods 1-25, wherein said removing step comprises removing substantially all of said existing refrigerant from the system. For the purposes of convenience, methods according to this paragraph are sometimes referred to herein as Retrofit Methods 26.

The present invention provides also methods for retrofitting an existing refrigeration system, including each of Retrofit Methods 1-26, wherein said existing heat transfer system is a refrigeration system. For the purposes of convenience, methods according to this paragraph are sometimes referred to herein as Retrofit Methods 27.

The present invention provides also methods for retrofitting an existing refrigeration system, including each of Retrofit Methods 1-26, wherein said existing heat transfer system is a low temperature refrigeration system. For the purposes of convenience, methods according to this paragraph are sometimes referred to herein as Retrofit Methods 28.

The present invention provides also methods for retrofitting an existing refrigeration system, including each of Retrofit Methods 1-26, wherein said existing heat transfer system is a medium temperature refrigeration system. For the purposes of convenience, methods according to this paragraph are sometimes referred to herein as Retrofit Methods 29.

The present invention provides also methods for retrofitting an existing refrigeration system, including each of Retrofit Methods 1-26, wherein said existing heat transfer system is an air conditioning system. For the purposes of convenience, methods according to this paragraph are sometimes referred to herein as Retrofit Methods 30.

The present invention provides also methods for retrofitting an existing refrigeration system, including each of Retrofit Methods 1-26, wherein said existing heat transfer system is a stationary air conditioning system. For the purposes of convenience, methods according to this paragraph are sometimes referred to herein as Retrofit Methods 31.

The present invention provides also methods for retrofitting an existing refrigeration system, including each of Retrofit Methods 1-26, wherein said existing heat transfer system is a chiller system. For the purposes of convenience, methods according to this paragraph are sometimes referred to herein as Retrofit Methods 32.

The present invention provides also methods for retrofitting an existing refrigeration system, including each of Retrofit Methods 1-26, wherein said existing heat transfer system is a water-cooled chiller system. For the purposes of convenience, methods according to this paragraph are sometimes referred to herein as Retrofit Methods 33.

The present invention provides also methods for retrofitting an existing refrigeration system, including each of Retrofit Methods 1-26, wherein said existing heat transfer system is an air-cooled chiller system. For the purposes of convenience, methods according to this paragraph are sometimes referred to herein as Retrofit Methods 34.

The present invention provides also methods for retrofitting an existing refrigeration system, including each of Retrofit Methods 1-34, wherein the existing vapor compression system further comprises a lubricant for said compressor.

For the purposes of convenience, methods according to this paragraph are sometimes referred to herein as Retrofit Methods 35A.

The present invention provides also methods for retrofitting an existing refrigeration system, including each of Retrofit Methods 1-34, wherein said adding step further comprises adding a lubricant for said compressor. For the purposes of convenience, methods according to this paragraph are sometimes referred to herein as Retrofit Methods 35B.

The present invention provides also methods for retrofitting an existing refrigeration system, including each of Retrofit Methods 1-35, wherein the existing vapor compression system further comprises a lubricant for said compressor wherein said lubricant is selected from polyol esters (POEs), polyvinyl ethers (PVEs), poly alkylene glycols (PAGs), PAG oils, silicone oil, mineral oil, alkyl benzenes (ABs) and poly(alpha-olefin) (PAO). For the purposes of convenience, methods according to this paragraph are sometimes referred to herein as Retrofit Methods 36.

As the terms are used herein, reference to a range of Retrofit Methods is intended to mean separately and independently each of the defined methods, including methods defined with a subscript, such as "Retrofit Methods 35A" and "Retrofit Methods 35B" when Retrofit Method 35 is included in the range. Thus, for example, reference to Retrofit Methods 1-36, means each of the refrigerants as defined in the range, include Retrofit Methods 35A and "Retrofit Methods 35B."

The present invention provides also methods for retrofitting an existing refrigeration system, including each of Retrofit Methods 1-35, wherein the existing vapor compression system further comprises a polyvinyl ether (PVE) lubricant. For the purposes of convenience, methods according to this paragraph are sometimes referred to herein as Retrofit Methods 37.

The present invention provides also methods for retrofitting an existing refrigeration system, including each of Retrofit Methods 1-35, wherein the existing vapor compression system further comprises a polyol ester (POE) lubricant. For the purposes of convenience, methods according to this paragraph are sometimes referred to herein as Retrofit Methods 38.

The present invention provides also methods for retrofitting an existing refrigeration system, including each of Retrofit Methods 1-38, wherein after said addition step said liquid refrigerant in said evaporator consists essentially of, on a weight basis with a tolerance of +/−0.5%: (i) from 33.3% to 41.5% of HFC-134; (ii) from 20.7% to 21.8% of HFO-1234yf; (iii) from 7.7% to 10.4% of HFO-1234ze(E); (iv) from 11.6% to 18.5% of HFC-32; and (iv) 15.1% to 19.8% of HFC-125. For the purposes of convenience, methods according to this paragraph are sometimes referred to herein as Retrofit Methods 39.

The present invention provides also methods for retrofitting an existing refrigeration system, including each of Retrofit Methods 1-39, wherein after said addition step said vapor refrigerant in said evaporator consists essentially of, on a weight basis with a tolerance of +/−0.5%: (i) from 18.6% to 27.1% of HFC-134; (ii) from 16.9% to 19.3% of HFO-1234yf; (iii) from 3.7% to 5.57 of HFO-1234ze(E); (iv) from about 24.8% to 33.6% of HFC-32; and (iv) 16.9% to 19.3% of HFC-125. For the purposes of convenience, methods according to this paragraph are sometimes referred to herein as Retrofit Methods 40.

The present invention provides also methods for retrofitting an existing refrigeration system, including each of Retrofit Methods 1, 5, 7-15 and 18-38, wherein after said addition step said liquid refrigerant in said evaporator consists essentially of, on a weight basis with a tolerance of +/−0.5%: (i) from 31.2% to 39.2% of HFC-134a; (ii) from 32.3% to 35% of HFO-1234yf; (iii) from 11.1% to 17.6% of HFC-32; and (iv) 14.8% to 18.9% of HFC-125. For the purposes of convenience, methods according to this paragraph are sometimes referred to herein as Retrofit Methods 41.

The present invention provides also methods for retrofitting an existing refrigeration system, including each of Retrofit Methods 1, 5, 7-15, 18-38 and 41, wherein after said addition step said vapor refrigerant in said evaporator consists essentially of, on a weight basis with a tolerance of +/−0.5%: (i) from 17.3% to 25.2% of HFC-134; (ii) from 25.1% to 29.2% of HFO-1234yf; (iii) from about 23.6% to 32.1% of HFC-32; and (iv) 22% to 25.5% of HFC-125. For the purposes of convenience, methods according to this paragraph are sometimes referred to herein as Retrofit Methods 42.

The present invention provides also refrigerant compositions consisting essentially of: (a) from about 25% to about 31% by weight of 1,1,1,2-tetrafluoroethane (HFC-134a); (b) from about 27% to about 32% by weight of trans-1,3,3,3-tetrafluoropropene (HFO-1234ze(E)) and/or 2,3,3,3-tetrafluoropropene (HFO-1234yf), provided that the composition comprises no more than about 22 wt % of HFO-1234yf; and (c) from 41.5%% to about 46% by weight of a combination of difluoromethane (HFC-32) and pentafluoroethane (HFC-125), provided that the weight ratio of HFO-32:HFC-125 is from about 1.21:1 to about 0.8:1. For the purposes of convenience, compositions according to the present paragraph are referred to herein as Refrigerant 1.

The present invention also includes refrigerant compositions consisting essentially of: (a) from 24.5% to 31.5% by weight of 1,1,1,2-tetrafluoroethane (HFC-134a); (b) from 26.5% to about 32.5% by weight of a combination of trans-1,3,3,3-tetrafluoropropene (HFO-1234ze(E)) and 2,3,3,3-tetrafluoropropene (HFO-1234yf), provided that the composition comprises no more than 22.5% by weight of HFO-1234yf; and (c) from 41.5% to 46.5% by weight of a combination of difluoromethane (HFC-32) and pentafluoroethane (HFC-125), provided that the weight ratio of HFO-32:HFC-125 is from about 1.21:1 to about 0.8:1. For the purposes of convenience, compositions according to the present paragraph are referred to herein as Refrigerant 2A.

The present invention also includes refrigerant compositions consisting essentially of: (a) from about 25% to about 31% by weight of 1,1,1,2-tetrafluoroethane (HFC-134a); (b) from about 27% to about 32% by weight to about 32% by weight of a combination of trans-1,3,3,3-tetrafluoropropene (HFO-1234ze(E)) and 2,3,3,3-tetrafluoropropene (HFO-1234yf), provided that the composition comprises at least about 6.5% by weight of HFO-1234ze(E); (c) about 22% by weight of difluoromethane (HFC-32) and about 22% by weight of pentafluoroethane (HFC-125). For the purposes of convenience, compositions according to the present paragraph are referred to herein as Refrigerant 2B.

The present invention provides also refrigerant compositions consisting essentially of:
- (a) about 31% by weight of 1,1,1,2-tetrafluoroethane (HFC-134a);
- (b) about 7% by weight of trans-1,3,3,3-tetrafluoropropene (HFO-1234ze(E));
- (c) about 20% by weight of 2,3,3,3-tetrafluoropropene (HFO-1234yf);
- (d) about 21% by weight of difluoromethane (HFC-32); and
- (e) about 21% by weight of pentafluoroethane (HFC-125). For the purposes of convenience, compositions according to the present paragraph are referred to herein as Refrigerant 3A.

The present invention provides also refrigerant compositions consisting essentially of:
- (a) about 26% by weight of 1,1,1,2-tetrafluoroethane (HFC-134a);
- (b) about 14 by weight of trans-1,3,3,3-tetrafluoropropene (HFO-1234ze(E));
- (c) about 18% by weight of 2,3,3,3-tetrafluoropropene (HFO-1234yf);
- (d) about 21% by weight of difluoromethane (HFC-32); and
- (e) about 21% by weight of pentafluoroethane (HFC-125). For the purposes of convenience, compositions according to the present paragraph are referred to herein as Refrigerant 3B.

The present invention provides also refrigerant compositions consisting essentially of:
- (a) about 25% by weight of 1,1,1,2-tetrafluoroethane (HFC-134a);
- (b) about 20% by weight of trans-1,3,3,3-tetrafluoropropene (HFO-1234ze(E));
- (c) about 11% by weight of 2,3,3,3-tetrafluoropropene (HFO-1234yf);
- (d) about 22% by weight of difluoromethane (HFC-32); and
- (e) about 22% by weight of pentafluoroethane (HFC-125). For the purposes of convenience, compositions according to the present paragraph are referred to herein as Refrigerant 3C.

The present invention provides also refrigerant compositions consisting essentially of:
- (a) about 25% by weight of 1,1,1,2-tetrafluoroethane (HFC-134a);
- (b) about 29% by weight of trans-1,3,3,3-tetrafluoropropene (HFO-1234ze(E));

(c) about 23% by weight of difluoromethane (HFC-32); and (e) about 23% by weight of pentafluoroethane (HFC-125). For the purposes of convenience, compositions according to the present paragraph are referred to herein as Refrigerant 3D.

The present invention also provides refrigerants, including each of Refrigerants 1-3, wherein the refrigerant is non-flammable. For the purposes of convenience, refrigerants according to this paragraph are sometimes referred to herein as Refrigerant 4.

The present invention also provides refrigerants, including each of Refrigerants 1-4, wherein the refrigerant has a GWP of less than 1500. For the purposes of convenience, refrigerants according to this paragraph are sometimes referred to herein as Refrigerant 5A.

The present invention also provides refrigerants, including each of Refrigerants 1-4, wherein the refrigerant has a GWP of less than 1350. For the purposes of convenience, refrigerants according to this paragraph are sometimes referred to herein as Refrigerant 5B.

The present invention also provides refrigerants, including each of Refrigerants 1-4, wherein the refrigerant has a GWP of less than 1300. For the purposes of convenience, refrigerants according to this paragraph are sometimes referred to herein as Refrigerant 5C.

The present invention also provides refrigerants, including each of Refrigerants 1-5, wherein the refrigerant has a capacity that is at least 90% of the capacity of R-22. For the purposes of convenience, refrigerants according to this paragraph are sometimes referred to herein as Refrigerant 6.

The present invention also provides refrigerants, including each of Refrigerants 1-6, wherein the refrigerant consists of HFC-134a, HFC-32, HFC-125, HFO-1234yf and HFO-1234ze(E). For the purposes of convenience, refrigerants according to this paragraph are sometimes referred to herein as Refrigerant 7.

The present invention also provides refrigerants consisting of:
(a) about 31% by weight of 1,1,1,2-tetrafluoroethane (HFC-134a);
(b) about 7% by weight of trans-1,3,3,3-tetrafluoropropene (HFO-1234ze(E));
(c) about 20% by weight of 2,3,3,3-tetrafluoropropene (HFO-1234yf);
(d) about 21% by weight of difluoromethane (HFC-32); and
(e) about 21% by weight of pentafluoroethane (HFC-125). For the purposes of convenience, refrigerants according to this paragraph are sometimes referred to herein as Refrigerant 8A.

The present invention also provides refrigerants consisting of:
(a) about 26% by weight of 1,1,1,2-tetrafluoroethane (HFC-134a);
(b) about 14% by weight of trans-1,3,3,3-tetrafluoropropene (HFO-1234ze(E));
(c) about 18% by weight of 2,3,3,3-tetrafluoropropene (HFO-1234yf);
(d) about 21% by weight of difluoromethane (HFC-32); and
(e) about 21% by weight of pentafluoroethane (HFC-125). For the purposes of convenience, refrigerants according to this paragraph are sometimes referred to herein as Refrigerant 8B.

The present invention also provides refrigerants consisting of:
(a) about 25% by weight of 1,1,1,2-tetrafluoroethane (HFC-134a);
(b) about 20% by weight of trans-1,3,3,3-tetrafluoropropene (HFO-1234ze(E));
(c) about 11% by weight of 2,3,3,3-tetrafluoropropene (HFO-1234yf);
(d) about 22% by weight of difluoromethane (HFC-32); and
(e) about 22% by weight of pentafluoroethane (HFC-125). For the purposes of convenience, refrigerants according to this paragraph are sometimes referred to herein as Refrigerant 8C.

The present invention also provides refrigerants consisting of:
(a) about 25% by weight of 1,1,1,2-tetrafluoroethane (HFC-134a);
(b) about 29% by weight of trans-1,3,3,3-tetrafluoropropene (HFO-1234ze(E));
(c) about 22% by weight of difluoromethane (HFC-32); and
(d) about 22% by weight of pentafluoroethane (HFC-125). For the purposes of convenience, refrigerants according to this paragraph are sometimes referred to herein as Refrigerant 8D.

The present invention also provides refrigerants, including each of Refrigerants 1-8, wherein the refrigerant consists of 21%+/−1% by weight of HFC-32, 21%+/−1% by weight of HFC-125, 20%+/−1% by weight of HFO-1234yf; 31%+/−1% by weight of HFC-134a, and 7%+/−1% by weight of HFO-1234ze(E). For the purposes of convenience, refrigerants according to this paragraph are sometimes referred to herein as Refrigerant 9.

The present invention also provides refrigerants, including each of Refrigerants 1-9, wherein the refrigerant consists of 21%+/−1% by weight of HFC-32, 21%+/−1% by weight of HFC-125, 20%+/−1% by weight of HFO-1234yf; 31%+/−1% by weight of HFC-134a, and 7%+/−0.5% by weight of HFO-1234ze(E). For the purposes of convenience, refrigerants according to this paragraph are sometimes referred to herein as Refrigerant 10.

The present invention also provides refrigerants, including each of Refrigerants 1-10, wherein the refrigerant is non-flammable. consists of 21%+/−1% by weight of HFC-32, 21%+/−1% by weight of HFC-125, 20%+/−1% by weight of HFO-1234yf; 31%+/−1% by weight of HFC-134a, and 7%+/−0.5% by weight of HFO-1234ze(E). For the purposes of convenience, refrigerants according to this paragraph are sometimes referred to herein as Refrigerant 11.

The present invention also provides refrigerants, including each of Refrigerants 1-11, wherein the refrigerant has a GWP of about 1320 or less. For the purposes of convenience, refrigerants according to this paragraph are sometimes referred to herein as Refrigerant 12.

The present invention also provides refrigerants, including each of Refrigerants 1-12, wherein the refrigerant comprises from 6.5% by weight to about 29% by weight of HFO-1234ze(E). For the purposes of convenience, refrigerants according to this paragraph are sometimes referred to herein as Refrigerant 13.

As the term is used herein, reference to a "Refrigerant" number means each of the refrigerants as defined having that number, including all Refrigerants having that number and all Refrigerants having that number with a letter designation, such as Refrigerant 3A and Refrigerant 3B.

According to the present invention, any one of Refrigerants 1-13 may be used in connection with any retrofit method, including any of Retrofit Methods 1-42.

The present invention provides also liquid refrigerant compositions consisting essentially of, on a weight basis with a tolerance of +/−0.5%: (i) from 22.8% to 41.5% of HFC-134a; (ii) from 20.7% to 23% of HFO-1234yf; (iii) from 7.7% to 10.9% of HFO-1234ze(E); (iv) from 11.6% to 23.65% of HFC-32; and (iv) 15.1% to 25.0% of HFC-125. For the purposes of convenience, liquid refrigerants according to this paragraph are sometimes referred to herein as Liquid Refrigerant 1.

The present invention provides also liquid refrigerant compositions consisting essentially of, on a weight basis with a tolerance of +/−0.5%: (i) from 33.3% to 41.5% of HFC-134a; (ii) from 20.7% to 21.8% of HFO-1234yf; (iii) from 7.7% to 10.4% of HFO-1234ze(E); (iv) from 11.6% to 18.5% of HFC-32; and (v) 15.1% to 19.8% of HFC-125. For the purposes of convenience, liquid refrigerants according to this paragraph are sometimes referred to herein as Liquid Refrigerant 2.

The present invention provides also liquid refrigerant compositions consisting essentially of, on a weight basis with a tolerance of +/−0.5%: (i) from 22.8% to 29.9% of HFC-134a; (ii) from 20.9% to 23.0% of HFO-1234yf; (iii) from 7.7% to 10.9% of HFO-1234ze(E); (iv) from 15.86% to 23.6% of HFC-32; and (v) 20.4% to 25.0% of HFC-125. For the purposes of convenience, liquid refrigerants according to this paragraph are sometimes referred to herein as Liquid Refrigerant 3.

The present invention provides also liquid refrigerant compositions consisting essentially of, on a weight basis with a tolerance of +/−0.5%: (i) from 31.2% to 39.2% of HFC-134a; (ii) from 32.3% to 35.0% of HFO-1234yf; (iii) from 11.1% to 17.6% of HFC-32; and (iv) 14.8% to 18.9% of HFC-125. For the purposes of convenience, liquid refrigerants according to this paragraph are sometimes referred to herein as Liquid Refrigerant 4.

According to the present invention, any one of Liquid Refrigerants 1-4 may be used in connection with any retrofit method, including any of Retrofit Methods 1-42.

The present invention provides also vaporous refrigerant compositions consisting essentially of, on a weight basis with a tolerance of +/−0.5%: (i) from 11.5% to 27.1% of HFC-134a; (ii) from 15.7% to 19.3% of HFO-1234yf; (iii) from 3.4% to 5.7% of HFO-1234ze(E); (iv) from 24.8% to 38.6% of HFC-32; and (v) 23.3% to 31.1% of HFC-125. For the purposes of convenience, vaporous refrigerants according to this paragraph are sometimes referred to herein as Vaporous Refrigerant 1.

The present invention provides also vaporous refrigerant compositions consisting essentially of, on a weight basis with a tolerance of +/−0.5%: (i) from 18.6% to 27.1% of HFC-134a; (ii) from 16.9% to 19.3% of HFO-1234yf; (iii) from 3.7% to 5.7% of HFO-1234ze(E); (iv) from 24.8% to 33.6% of HFC-32; and (v) 23.3% to 27.2% of HFC-125. For the purposes of convenience, vaporous refrigerants according to this paragraph are sometimes referred to herein as Vaporous Refrigerant 2.

The present invention provides also vaporous refrigerant compositions consisting essentially of, on a weight basis with a tolerance of +/−0.5%: (i) from 11.5% to 17.7% of HFC-134a; (ii) from 15.7% to 18.6% of HFO-1234yf; (iii) from 3.4% to 5.5% of HFO-1234ze(E); (iv) from 30.1% to 38.3% of HFC-32; and (v) 28.2% to 31.1% of HFC-125. For the purposes of convenience, vaporous refrigerants according to this paragraph are sometimes referred to herein as Vaporous Refrigerant 3.

The present invention provides also vaporous refrigerant compositions consisting essentially of, on a weight basis with a tolerance of +/−0.5%: ((i) from 23.6% to 32.1% of HFC-134a; (ii) from 25.1% to 29.2% of HFO-1234yf; (iii) from 23.6% to 32.1% of HFC-32; and (iv) 22.0% to 25.4% of HFC-125. For the purposes of convenience, vaporous refrigerants according to this paragraph are sometimes referred to herein as Vaporous Refrigerant 4.

According to the present invention, any one of Vaporous Refrigerants 1-4 may be used in connection with any retrofit method, including any of Retrofit Methods 1-42.

The present invention provides also heat transfer systems comprising:
(a) a compressor in fluid communication with a condenser and an evaporator, wherein the evaporator comprises a flooded evaporator;
(b) a liquid refrigerant in said flooded evaporator, said liquid refrigerant consisting essentially of, on a weight basis with a tolerance of +/−0.5%: (i) from 22.8% to 41.5% of HFC-134a; (ii) from 20.7% to 23% of HFO-1234yf; (iii) from 7.7% to 10.9% of HFO-1234ze(E); (iv) from 11.6% to 23.65% of HFC-32; and (iv) 15.1% to 25.0% of HFC-125; and
(c) and a vapor refrigerant in said flooded evaporator, said vapor refrigerant consisting essentially of, on a weight basis with a tolerance of +/−0.5%: (i) from 11.5% to 27.1% of HFC-134a; (ii) from 15.7% to 19.3% of HFO-1234yf; (iii) from 3.4% to 5.7% of HFO-1234ze(E); (iv) from 24.8% to 38.6% of HFC-32; and (v) 23.3% to 31.1% of HFC-125.

For the purposes of convenience, heat transfer systems according to this paragraph are sometimes referred to herein as Heat Transfer System 1.

The present invention provides also heat transfer systems comprising:
(a) a compressor in fluid communication with a condenser and an evaporator, wherein the evaporator comprises a flooded evaporator;
(b) a liquid refrigerant in said flooded evaporator, said liquid refrigerant consisting essentially of, on a weight basis with a tolerance of +/−0.5%: (i) from 33.3% to 41.5% of HFC-134a; (ii) from 20.7% to 21.8% of HFO-1234yf; (iii) from 7.7% to 10.4% of HFO-1234ze(E); (iv) from 11.6% to 18.5% of HFC-32; and (v) 15.1% to 19.8% of HFC-125; and
(c) and a vapor refrigerant in said flooded evaporator, said vapor refrigerant consisting essentially of, on a weight basis with a tolerance of +/−0.5 i) from 18.6% to 27.1% of HFC-134a; (ii) from 16.9% to 19.3% of HFO-1234yf; (iii) from 3.7% to 5.7% of HFO-1234ze(E); (iv) from 24.8% to 33.6% of HFC-32; and (v) 23.3% to 27.2% of HFC-125.

For the purposes of convenience, heat transfer systems according to this paragraph are sometimes referred to herein as Heat Transfer System 2.

The present invention provides also heat transfer systems comprising:
(a) a compressor in fluid communication with a condenser and an evaporator, wherein the evaporator comprises a flooded evaporator;
(b) a liquid refrigerant in said flooded evaporator, said liquid refrigerant consisting essentially of, on a weight basis with a tolerance of +/−0.5%: (i) from 22.8% to 29.9% of HFC-134a; (ii) from 20.9% to 23.0% of HFO-1234yf; (iii) from 7.7% to 10.9% of HFO-1234ze (E); (iv) from 15.8% to 23.6% of HFC-32; and (v) 20.4% to 25.0% of HFC-125; and (c) and a vapor refrigerant in said flooded evaporator, said vapor refrigerant consisting essentially of, on a weight basis with a tolerance of +/−0.5: (i) from 11.5% to 17.7% of HFC-134a; (ii) from 15.7% to 18.6% of HFO-1234yf; (iii) from 3.4% to 5.5% of HFO-1234ze (E); (iv) from 30.1% to 38.3% of HFC-32; and (v) 28.2% to 31.1% of HFC-125.

For the purposes of convenience, heat transfer systems according to this paragraph are sometimes referred to herein as Heat Transfer System 3.

The present invention provides also heat transfer systems comprising:

(a) a compressor in fluid communication with a condenser and an evaporator, wherein the evaporator comprises a flooded evaporator;

(b) liquid refrigerant in said flooded evaporator, said liquid refrigerant consisting essentially of, on a weight basis with a tolerance of +/−0.5%: (i) (i) from 31.2% to 39.2% of HFC-134a; (ii) from 32.3% to 35.0% of HFO-1234yf; (iii) from 11.1% to 17.6% of HFC-32; and (iv) 14.8% to 18.9% of HFC-125; and (d) and a vapor refrigerant in said flooded evaporator, said vapor refrigerant consisting essentially of, on a weight basis with a tolerance of +/−0.5: i) from 11.5% to 17.7% of HFC-134a; (ii) from 15.7% to 18.6% of HFO-1234yf; (iii) from 3.4% to 5.5% of HFO-1234ze (E); (iv) from 30.1% to 38.3% of HFC-32; and (iv) 28.2% to 31.1% of HFC-125.

For the purposes of convenience, heat transfer systems according to this paragraph are sometimes referred to herein as Heat Transfer System 4.

According to the present invention, any one of Refrigerants 1-13 may be used in connection with any heat transfer system, including any of Heat Transfer Systems 1-4.

The present invention provides also methods for cooling comprising:

(a) providing a compression refrigeration system comprising: (i) a liquid refrigerant and a refrigerant; (ii) a compressor receiving said gaseous refrigerant at a first pressure and producing gaseous refrigerant at second pressure above said first pressure; (ii) a condenser which receives gaseous refrigerant exiting said compressor and which rejects heat from said gaseous refrigerant to produce said liquid refrigerant; (iii) a pressure reducer receiving said liquid refrigerant from said condenser and producing a mixture of said liquid and said gaseous refrigerant at a pressure below said second pressure; (iv) optionally an accumulator which receives said mixture from said pressure reducer and separates said gaseous refrigerant from said liquid refrigerant and produces a liquid refrigerant stream and a gaseous refrigerant stream which flows to the low pressure side of said compressor; and (v) a flooded evaporator receiving said liquid refrigerant from said pressure reducer and/or said accumulator when present and producing said gaseous refrigerant which flows to the low pressure side of said compressor and/or to the accumulator when present;

(b) evaporating said liquid refrigerant in said flooded evaporator to produce vaporous refrigerant, wherein: (1) said liquid refrigerant in said evaporator consists essentially of, on a weight basis with a tolerance of +/−0.5%: (i) from 22.8% to 41.5% of HFC-134a; (ii) from 20.7% to 23% of HFO-1234yf; (iii) from 7.7% to 10.9% of HFO-1234ze(E); (iv) from 11.6% to 23.6% of HFC-32; and (iv) 15.1% to 25.0% of HFC-125; and (ii) said vaporous refrigerant in said evaporator consists essentially of, on a weight basis with a tolerance of +/−0.5%: (i) from 11.5% to 27.1% of HFC-134a; (ii) from 15.7% to 19.3% of HFO-1234yf; (iii) from 3.4% to 5.7% of HFO-1234ze(E); (iv) from 24.8% to 23.6% of HFC-32; and (iv) 23.3% to 31.1% of HFC-125; and (c) operating said system at a capacity of at least about 90% relative to R-22 in said system and wherein said compressor has a power consumption that is less than about 120% of the power consumption of R-22 in said system. For the purposes of convenience, refrigerants according to this paragraph are sometimes referred to herein as Heat Transfer Methods 1A.

The present invention provides also methods for cooling comprising:

(a) providing a compression refrigeration system comprising: (i) a liquid refrigerant and a vaporous refrigerant; (ii) a compressor receiving said vaporous refrigerant at a first pressure and producing vaporous refrigerant at second pressure above said first pressure; (ii) a condenser which receives vaporous refrigerant exiting said compressor and which rejects heat from said vaporous refrigerant to produce said liquid refrigerant; (iii) a pressure reducer receiving said liquid refrigerant from said condenser and producing a mixture of said liquid and said vaporous refrigerant at a pressure below said second pressure; (iv) optionally an accumulator which receives said mixture from said pressure reducer and separates said vaporous refrigerant from said liquid refrigerant and produces a liquid refrigerant stream and a vaporous refrigerant stream which flows to the low pressure side of said compressor; and (v) a flooded evaporator receiving said liquid refrigerant from said pressure reducer and/or said accumulator when present and producing said vaporous refrigerant which flows to the low pressure side of said compressor and/or to the accumulator when present;

(b) evaporating said liquid refrigerant in said flooded evaporator to produce said vaporous refrigerant, wherein in said evaporator: (1) said liquid refrigerant in said evaporator consists essentially of, on a weight basis with a tolerance of +/−0.5%: (i) from 33.3% to 41.5% of HFC-134a; (ii) from 20.7% to 21.8% of HFO-1234yf; (iii) from 7.7% to 10.4% of HFO-1234ze (E); (iv) from 11.6% to 18.5% of HFC-32; and (v) 15.1% to 19.8% of HFC-125; and (2) said vaporous refrigerant in said evaporator consists essentially of, on a weight basis with a tolerance of +/−0.5%: (i) from 18.6% to 27.1% of HFC-134a; (ii) from 16.9% to 19.3% of HFO-1234yf; (iii) from 3.7% to 5.7% of HFO-1234ze(E); (iv) from 24.8% to 33.6% of HFC-32; and (v) 23.3% to 27.2% of HFC-125; and (c) operating said system at a capacity of at least about 90% relative to R-22 in said system and wherein said compressor has a power consumption that is less than about 120% of the power consumption of R-22 in said system. For the purposes of convenience, refrigerants according to this paragraph are sometimes referred to herein as Heat Transfer Methods 1B.

The present invention provides also methods for cooling comprising:

(a) providing a compression refrigeration system comprising: (i) a liquid refrigerant and a vaporous refrigerant; (ii) a compressor receiving said vaporous refrigerant at a first pressure and producing vaporous refrigerant at second pressure above said first pressure; (ii) a condenser which receives vaporous refrigerant exiting said compressor and which rejects heat from said vaporous refrigerant to produce said liquid refrigerant; (iii) a pressure reducer receiving said liquid refrigerant from said condenser and producing a mixture of said liquid and said vaporous refrigerant at a pressure below said second pressure; (iv) optionally an accumulator which receives said mixture from said pressure reducer and separates said vaporous refrigerant from said liquid refrigerant and produces a liquid refrigerant stream and a vaporous refrigerant stream which flows to the low pressure side of said compressor; and (v) a flooded evaporator receiving said liquid refrigerant from said pressure reducer and/or said accumulator when present and producing said vaporous refrigerant which flows to the low pressure side of said compressor and/or to the accumulator when present;

(b) evaporating said liquid refrigerant in said flooded evaporator to produce said vaporous refrigerant, wherein in said evaporator: (1) said liquid refrigerant in said evaporator consists essentially of, on a weight basis with a tolerance of +/−0.5%: (i) from 22.8% to 29.9% of HFC-134a; (ii) from 20.9% to 23.0% of HFO-1234yf; (iii) from 7.7% to 10.9% of HFO-1234ze(E); (iv) from 15.86% to 23.6% of HFC-32; and (v) 20.4% to 25.0% of HFC-125; and (2) said vaporous refrigerant in said evaporator consists essentially of, on a weight basis with a tolerance of +/−0.5%: (i) from 11.5% to 17.7% of HFC-134a; (ii) from 15.7% to 18.6% of HFO-1234yf; (iii) from 3.4% to 5.5% of HFO-1234ze(E); (iv) from 30.1% to 38.3% of HFC-32; and (v) 28.2% to 31.1% of HFC-125; and (c) operating said system at a capacity of at least about 90% relative to R-22 in said system and wherein said compressor has a power consumption that is less than about 120% of the power consumption of R-22 in said system. For the purposes of convenience, refrigerants according to this paragraph are sometimes referred to herein as Heat Transfer Methods 1C.

The present invention provides also methods for cooling comprising:

(a) providing a compression refrigeration system comprising: (i) a liquid refrigerant and a vaporous refrigerant; (ii) a compressor receiving said vaporous refrigerant at a first pressure and producing vaporous refrigerant at second pressure above said first pressure; (ii) a condenser which receives vaporous refrigerant exiting said compressor and which rejects heat from said vaporous refrigerant to produce said liquid refrigerant; (iii) a pressure reducer receiving said liquid refrigerant from said condenser and producing a mixture of said liquid and said vaporous refrigerant at a pressure below said second pressure; (iv) optionally an accumulator which receives said mixture from said pressure reducer and separates said vaporous refrigerant from said liquid refrigerant and produces a liquid refrigerant stream and a vaporous refrigerant stream which flows to the low pressure side of said compressor; and (v) a flooded evaporator receiving said liquid refrigerant from said pressure reducer and/or said accumulator when present and producing said vaporous refrigerant which flows to the low pressure side of said compressor and/or to the accumulator when present;

(b) evaporating said liquid refrigerant in said flooded evaporator to produce said vaporous refrigerant, wherein in said evaporator: (1) said liquid refrigerant in said evaporator consists essentially of, on a weight basis with a tolerance of +/−0.5%: (i) from 31.2% to 39.2% of HFC-134a; (ii) from 32.3% to 35.0% of HFO-1234yf; (iii) from 11.1% to 17.6% of HFC-32; and (iv) 14.8% to 18.9% of HFC-125; and (2) said vaporous refrigerant in said evaporator consists essentially of, on a weight basis with a tolerance of +/−0.5%: (i) from 11.5% to 17.7% of HFC-134a; (ii) from 15.7% to 18.6% of HFO-1234yf; (iii) from 3.4% to 5.5% of HFO-1234ze(E); (iv) from 30.1% to 38.3% of HFC-32; and (iv) 28.2% to 31.1% of HFC-125; and (c) operating said system at a capacity of at least about 90% relative to R-22 in said system and wherein said compressor has a power consumption that is less than about 120% of the power consumption of R-22 in said system. For the purposes of convenience, refrigerants according to this paragraph are sometimes referred to herein as Heat Transfer Methods 1D.

The present invention provides also methods for providing cooling in low or medium temperature refrigeration conditions comprising:

(a) providing a compression refrigeration system comprising: (i) refrigerant; (ii) a compressor receiving gaseous refrigerant at a first pressure and producing gaseous refrigerant at second pressure above said first pressure; (ii) a condenser which receives gaseous refrigerant exiting said compressor and which rejects heat from said gaseous refrigerant to produce liquid refrigerant; (iii) a pressure reducer receiving liquid refrigerant from said condenser and producing a mixture of liquid and vaporous refrigerant at a pressure below said second pressure; (iv) optionally an accumulator which receives said mixture from said pressure reducer and separates said gaseous refrigerant from said liquid refrigerant and produces a liquid refrigerant stream and a gaseous refrigerant stream which flows to the low pressure side of said compressor; and (v) a flooded evaporator receiving said liquid refrigerant from said pressure reducer and/or said accumulator when present and producing gaseous refrigerant which flows to the low pressure side of said compressor and/or to the accumulator when present;

(b) evaporating said refrigerant is said flooded evaporator to produce vaporous refrigerant wherein (1) said liquid refrigerant in said flooded evaporator consists essentially of, on a weight basis with a tolerance of +/−0.5%: (i) from 22.8% to 41.5% of HFC-134a; (ii) from 20.7% to 23% of HFO-1234yf; (iii) from 7.7% to 10.9% of HFO-1234ze(E); (v) from 11.6% to 23.65% of HFC-32; and (iv) 15.1% to 25.0% of HFC-125; and (2) said vaporous refrigerant in said flooded evaporator consists essentially of, on a weight basis with a tolerance of +/−0.5%: (i) from 11.5% to 27.1% of HFC-134a; (ii) from 15.7% to 19.3% of HFO-1234yf; (iii) from 3.4% to 5.7% of HFO-1234ze(E); (iv) from 24.8% to 23.6% of HFC-32; and (v) 23.3% to 31.1% of HFC-125; and (3) said liquid refrigerant evaporates in said evaporator at a temperature of from about −65° C. up to and including about 0° C.; and (c) operating said system at a capacity of at least about 90% relative to R-22 in said system and wherein said compressor has a power consumption that is less than about 120% of the power consumption of R-22 in said system. For the purposes of convenience, refrigerants according to this paragraph are sometimes referred to herein as Heat Transfer Methods 2A.

The present invention provides also methods for providing cooling in low or medium temperature refrigeration conditions comprising:
- (a) providing a compression refrigeration system comprising: (i) refrigerant; (ii) a compressor receiving vaporous refrigerant at a first pressure and producing vaporous refrigerant at second pressure above said first pressure; (ii) a condenser which receives vaporous refrigerant exiting said compressor and which rejects heat from said vaporous refrigerant to produce liquid refrigerant; (iii) a pressure reducer receiving liquid refrigerant from said condenser and producing a mixture of liquid and vaporous refrigerant at a pressure below said second pressure; (iv) optionally an accumulator which receives said mixture from said pressure reducer and separates said vaporous refrigerant from said liquid refrigerant and produces a liquid refrigerant stream and a vaporous refrigerant stream which flows to the low pressure side of said compressor; and (v) a flooded evaporator receiving said liquid refrigerant from said pressure reducer and/or said accumulator when present and producing vaporous refrigerant which flows to the low pressure side of said compressor and/or to the accumulator when present;
- (b) evaporating said refrigerant is said flooded evaporator to produce vaporous refrigerant wherein (1) said liquid refrigerant in said flooded evaporator consists essentially of, on a weight basis with a tolerance of +/−0.5%: (i) from 33.3% to 41.5% of HFC-134a; (ii) from 20.7% to 21.8% of HFO-1234yf; (iii) from 7.7% to 10.4% of HFO-1234ze(E); (iv) from 11.6% to 18.5% of HFC-32; and (v) 15.1% to 19.8% of HFC-125; and (2) said vaporous refrigerant in said flooded evaporator consists essentially of, on a weight basis with a tolerance of +/−0.5%: (i) from 18.6% to 27.1% of HFC-134a; (ii) from 16.9% to 19.3% of HFO-1234yf; (iii) from 3.7% to 5.7% of HFO-1234ze(E); (iv) from 24.8% to 33.6% of HFC-32; and (v) 23.3% to 27.2% of HFC-125; and (3) said liquid refrigerant evaporates in said evaporator at a temperature of from about −65° C. up to and including about 0° C.; and
- (c) operating said system at a capacity of at least about 90% relative to R-22 in said system and wherein said compressor has a power consumption that is less than about 120% of the power consumption of R-22 in said system. For the purposes of convenience, refrigerants according to this paragraph are sometimes referred to herein as Heat Transfer Methods 2B.

The present invention provides also methods for providing cooling in low or medium temperature refrigeration conditions comprising:
- (a) providing a compression refrigeration system comprising: (i) refrigerant; (ii) a compressor receiving vaporous refrigerant at a first pressure and producing vaporous refrigerant at second pressure above said first pressure; (ii) a condenser which receives vaporous refrigerant exiting said compressor and which rejects heat from said vaporous refrigerant to produce liquid refrigerant; (iii) a pressure reducer receiving liquid refrigerant from said condenser and producing a mixture of liquid and vaporous refrigerant at a pressure below said second pressure; (iv) optionally an accumulator which receives said mixture from said pressure reducer and separates said vaporous refrigerant from said liquid refrigerant and produces a liquid refrigerant stream and a vaporous refrigerant stream which flows to the low pressure side of said compressor; and (v) a flooded evaporator receiving said liquid refrigerant from said pressure reducer and/or said accumulator when present and producing vaporous refrigerant which flows to the low pressure side of said compressor and/or to the accumulator when present;
- (b) evaporating said refrigerant is said flooded evaporator to produce vaporous refrigerant wherein (1) said liquid refrigerant in said flooded evaporator consists essentially of, on a weight basis with a tolerance of +/−0.5%: (i) from 22.8% to 29.9% of HFC-134a; (ii) from 20.9% to 23.0% of HFO-1234yf; (iii) from 7.7% to 10.9% of HFO-1234ze(E); (iv) from 15.86% to 23.6% of HFC-32; and (v) 20.4% to 25.0% of HFC-125; and (2) said vaporous refrigerant in said flooded evaporator consists essentially of, on a weight basis with a tolerance of +/−0.5%: (i) from 11.5% to 17.7% of HFC-134a; (ii) from 15.7% to 18.6% of HFO-1234yf; (iii) from 3.4% to 5.5% of HFO-1234ze(E); (iv) from 30.1% to 38.3% of HFC-32; and (v) 28.2% to 31.1% of HFC-125; and (3) said liquid refrigerant evaporates in said evaporator at a temperature of from about −65° C. up to and including about 0° C.; and
- (c) operating said system at a capacity of at least about 90% relative to R-22 in said system and wherein said compressor has a power consumption that is less than about 120% of the power consumption of R-22 in said system. For the purposes of convenience, refrigerants according to this paragraph are sometimes referred to herein as Heat Transfer Methods 2C.

The present invention provides also methods for providing cooling in low or medium temperature refrigeration conditions comprising:
- (a) providing a compression refrigeration system comprising: (i) refrigerant; (ii) a compressor receiving vaporous refrigerant at a first pressure and producing vaporous refrigerant at second pressure above said first pressure; (ii) a condenser which receives vaporous refrigerant exiting said compressor and which rejects heat from said vaporous refrigerant to produce liquid refrigerant; (iii) a pressure reducer receiving liquid refrigerant from said condenser and producing a mixture of liquid and vaporous refrigerant at a pressure below said second pressure; (iv) optionally an accumulator which receives said mixture from said pressure reducer and separates said vaporous refrigerant from said liquid refrigerant and produces a liquid refrigerant stream and a vaporous refrigerant stream which flows to the low pressure side of said compressor; and (v) a flooded evaporator receiving said liquid refrigerant from said pressure reducer and/or said accumulator when present and producing vaporous refrigerant which flows to the low pressure side of said compressor and/or to the accumulator when present;
- (b) evaporating said refrigerant is said flooded evaporator to produce vaporous refrigerant wherein (1) said liquid refrigerant in said flooded evaporator consists essentially of, on a weight basis with a tolerance of +/−0.5%: (i) from 31.2% to 39.2% of HFC-134a; (ii) from 32.3% to 35.0% of HFO-1234yf; (iii) from 11.1% to 17.6% of HFC-32; and (iv) 14.8% to 18.9% of HFC-125; and (2) said vaporous refrigerant in said flooded evaporator consists essentially of, on a weight basis with a tolerance of +/−0.5%: (i) from 11.5% to 17.7% of HFC-134a; (ii) from 15.7% to 18.6% of HFO-1234yf; (iii) from 3.4% to 5.5% of HFO-1234ze(E); (iv) from 30.1% to 38.3% of HFC-32; and (iv) 28.2% to 31.1% of HFC-125; and (3) said liquid refrigerant evaporates in said evaporator at a temperature of from about −65° C. up to and including about 0° C.; and (c) operating said system at a capacity of at least about 90% relative to R-22 in said system and wherein said compressor has a power consumption that is less than about 120% of the power consumption of R-22 in said system. For the purposes of convenience, refrigerants according to this paragraph are sometimes referred to herein as Heat Transfer Methods 2D.

The present invention provides also methods for providing cooling in low or medium temperature refrigeration conditions comprising:

(a) providing a compression refrigeration system comprising: (i) refrigerant; (ii) a compressor receiving vaporous refrigerant at a first pressure and producing vaporous refrigerant at second pressure above said first pressure; (ii) a condenser which receives vaporous refrigerant exiting said compressor and which rejects heat from said vaporous refrigerant to produce liquid refrigerant; (iii) a pressure reducer receiving liquid refrigerant from said condenser and producing a mixture of liquid and vaporous refrigerant at a pressure below said second pressure; (iv) optionally an accumulator which receives said mixture from said pressure reducer and separates said vaporous refrigerant from said liquid refrigerant and produces a liquid refrigerant stream and a vaporous refrigerant stream which flows to the low pressure side of said compressor; and (v) a flooded evaporator receiving said liquid refrigerant from said pressure reducer and/or said accumulator when present and producing vaporous refrigerant which flows to the low pressure side of said compressor and/or to the accumulator when present;

(b) evaporating said refrigerant is said flooded evaporator to produce vaporous refrigerant wherein (1) said liquid refrigerant in said flooded evaporator consists essentially of, on a weight basis with a tolerance of +/−0.5%: (i) from 22.8% to 41.5% of HFC-134a; (ii) from 20.7% to 23% of HFO-1234yf; (iii) from 7.7% to 10.9% of HFO-1234ze(E); (v) from 11.6% to 23.65% of HFC-32; and (iv) 15.1% to 25.0% of HFC-125; and (2) said vaporous refrigerant in said flooded evaporator consists essentially of, on a weight basis with a tolerance of +/−0.5%: (i) from 11.5% to 27.1% of HFC-134a; (ii) from 15.7% to 19.3% of HFO-1234yf; (iii) from 3.4% to 5.7% of HFO-1234ze(E); (iv) from 24.8% to 23.6% of HFC-32; and (v) 23.3% to 31.1% of HFC-125; and (3) said liquid refrigerant evaporates in said evaporator at a temperature of from about −20° C. up to and including about 20° C.; and (c) operating said system at a capacity of at least about 90% relative to R-22 in said system and wherein said compressor has a power consumption that is less than about 120% of the power consumption of R-22 in said system. For the purposes of convenience, refrigerants according to this paragraph are sometimes referred to herein as Heat Transfer Methods 3A.

The present invention provides also methods for providing cooling in low or medium temperature refrigeration conditions comprising:

(a) providing a compression refrigeration system comprising: (i) refrigerant; (ii) a compressor receiving vaporous refrigerant at a first pressure and producing vaporous refrigerant at second pressure above said first pressure; (ii) a condenser which receives vaporous refrigerant exiting said compressor and which rejects heat from said vaporous refrigerant to produce liquid refrigerant; (iii) a pressure reducer receiving liquid refrigerant from said condenser and producing a mixture of liquid and vaporous refrigerant at a pressure below said second pressure; (iv) optionally an accumulator which receives said mixture from said pressure reducer and separates said vaporous refrigerant from said liquid refrigerant and produces a liquid refrigerant stream and a vaporous refrigerant stream which flows to the low pressure side of said compressor; and (v) a flooded evaporator receiving said liquid refrigerant from said pressure reducer and/or said accumulator when present and producing vaporous refrigerant which flows to the low pressure side of said compressor and/or to the accumulator when present;

(b) evaporating said refrigerant is said flooded evaporator to produce vaporous refrigerant wherein (1) said liquid refrigerant in said flooded evaporator consists essentially of, on a weight basis with a tolerance of +/−0.5%: (i) from 33.3% to 41.5% of HFC-134a; (ii) from 20.7% to 21.8% of HFO-1234yf; (iii) from 7.7% to 10.4% of HFO-1234ze(E); (iv) from 11.6% to 18.5% of HFC-32; and (v) 15.1% to 19.8% of HFC-125; and (2) said vaporous refrigerant in said flooded evaporator consists essentially of, on a weight basis with a tolerance of +/−0.5%: (i) from 18.6% to 27.1% of HFC-134a; (ii) from 16.9% to 19.3% of HFO-1234yf; (iii) from 3.7% to 5.7% of HFO-1234ze(E); (iv) from 24.8% to 33.6% of HFC-32; and (v) 23.3% to 27.2% of HFC-125; and (3) said liquid refrigerant evaporates in said evaporator at a temperature of from about −20° C. up to and including about 20° C.; and (c) operating said system at a capacity of at least about 90% relative to R-22 in said system and wherein said compressor has a power consumption that is less than about 120% of the power consumption of R-22 in said system. For the purposes of convenience, refrigerants according to this paragraph are sometimes referred to herein as Heat Transfer Methods 3B.

The present invention provides also methods for providing cooling in low or medium temperature refrigeration conditions comprising:

(a) providing a compression refrigeration system comprising: (i) refrigerant; (ii) a compressor receiving vaporous refrigerant at a first pressure and producing vaporous refrigerant at second pressure above said first pressure; (ii) a condenser which receives vaporous refrigerant exiting said compressor and which rejects heat from said vaporous refrigerant to produce liquid refrigerant; (iii) a pressure reducer receiving liquid refrigerant from said condenser and producing a mixture of liquid and vaporous refrigerant at a pressure below said second pressure; (iv) optionally an accumulator which receives said mixture from said pressure reducer and separates said vaporous refrigerant from said liquid refrigerant and produces a liquid refrigerant stream and a vaporous refrigerant stream which flows to the low pressure side of said compressor; and (v) a flooded evaporator receiving said liquid refrigerant from said pressure reducer and/or said accumulator when present and producing vaporous refrigerant which flows to the low pressure side of said compressor and/or to the accumulator when present;

(b) evaporating said refrigerant is said flooded evaporator to produce vaporous refrigerant wherein (1) said liquid refrigerant in said flooded evaporator consists essentially of, on a weight basis with a tolerance of +/−0.5%: (i) from 22.8% to 29.9% of HFC-134a; (ii) from 20.9% to 23.0% of HFO-1234yf; (iii) from 7.7% to 10.9% of HFO-1234ze(E); (iv) from 15.86% to 23.6% of HFC-32; and (v) 20.4% to 25.0% of HFC-125; and (2) said vaporous refrigerant in said flooded evaporator consists essentially of, on a weight basis with a tolerance of +/−0.5%: (i) from 11.5% to 17.7% of HFC-134a; (ii) from 15.7% to 18.6% of HFO-1234yf; (iii) from 3.4% to 5.5% of HFO-1234ze(E); (iv) from 30.1% to 38.3% of HFC-32; and (v) 28.2% to 31.1% of HFC-125; and (3) said liquid refrigerant evaporates in said evaporator at a temperature of from about −20° C. up to and including about 20° C.; and (c) operating said system at a capacity of at least about 90% relative to R-22 in said system and wherein said compressor has a power consumption that is less than about 120% of the power consumption of R-22 in said system. For the purposes of convenience, refrigerants according to this paragraph are sometimes referred to herein as Heat Transfer Methods 3C.

The present invention provides also methods for providing cooling in low or medium temperature refrigeration conditions comprising:

(a) providing a compression refrigeration system comprising: (i) refrigerant; (ii) a compressor receiving vaporous refrigerant at a first pressure and producing vaporous refrigerant at second pressure above said first pressure; (ii) a condenser which receives vaporous refrigerant exiting said compressor and which rejects heat from said vaporous refrigerant to produce liquid refrigerant; (iii) a pressure reducer receiving liquid refrigerant from said condenser and producing a mixture of liquid and vaporous refrigerant at a pressure below said second pressure; (iv) optionally an accumulator which receives said mixture from said pressure reducer and separates said vaporous refrigerant from said liquid refrigerant and produces a liquid refrigerant stream and a vaporous refrigerant stream which flows to the low pressure side of said compressor; and (v) a flooded evaporator receiving said liquid refrigerant from said pressure reducer and/or said accumulator when present and producing vaporous refrigerant which flows to the low pressure side of said compressor and/or to the accumulator when present;

(b) evaporating said refrigerant is said flooded evaporator to produce vaporous refrigerant wherein (1) said liquid refrigerant in said flooded evaporator consists essentially of, on a weight basis with a tolerance of +/−0.5%: (i) from 31.2% to 39.2% of HFC-134a; (ii) from 32.3% to 35.0% of HFO-1234yf; (iii) from 11.1% to 17.6% of HFC-32; and (iv) 14.8% to 18.9% of HFC-125; and (2) said vaporous refrigerant in said flooded evaporator consists essentially of, on a weight basis with a tolerance of +/−0.5%: (i) from 11.5% to 17.7% of HFC-134a; (ii) from 15.7% to 18.6% of HFO-1234yf; (iii) from 3.4% to 5.5% of HFO-1234ze(E); (iv) from 30.1% to 38.3% of HFC-32; and (iv) 28.2% to 31.1% of HFC-125; and (3) said liquid refrigerant evaporates in said evaporator at a temperature of from about −20° C. up to and including about 20° C.; and (c) operating said system at a capacity of at least about 90% relative to R-22 in said system and wherein said compressor has a power consumption that is less than about 120% of the power consumption of R-22 in said system. For the purposes of convenience, refrigerants according to this paragraph are sometimes referred to herein as Heat Transfer Methods 3D.

According to the present invention, any one of Refrigerants 1-13 may be used in connection with any heat transfer method, including any of Heat Transfer Methods 1-3.

DETAILED DESCRIPTION

Definitions

Figure 1:
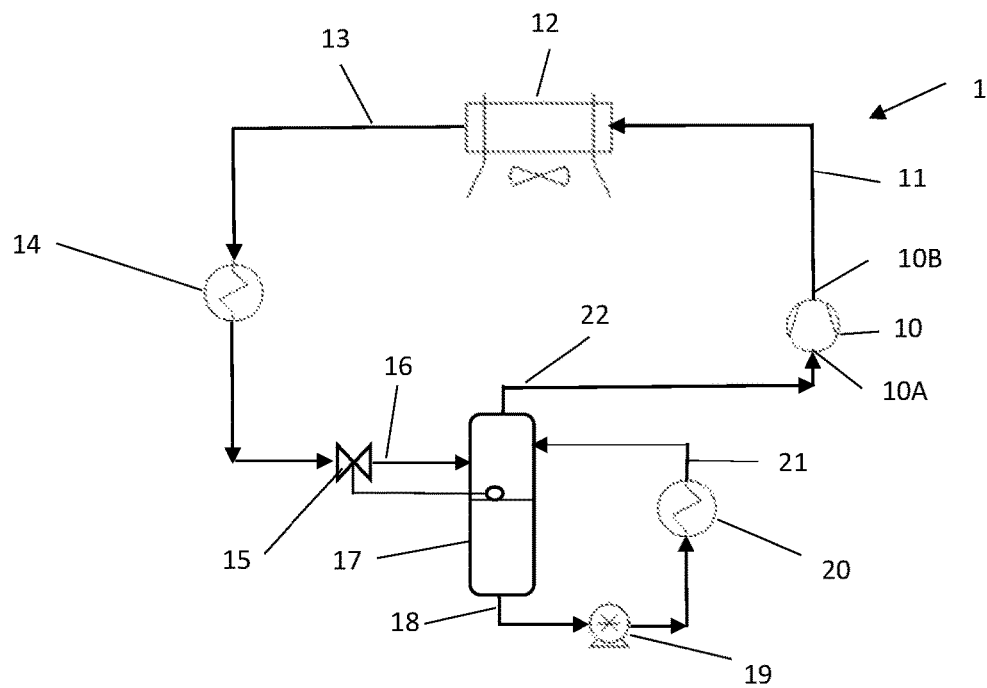
FIG. 1 is a process flow diagram showing a heat transfer system using an accumulator and a flooded evaporator according to the present invention.

For the purposes of this invention, the term "about" in relation to the amounts expressed in weight percent for amounts greater than 2% means that the amount of the component can vary by an amount of +/−2% by weight.

For the purposes of this invention, the term "about" in relation to temperatures in degrees centigrade (° C.) means that the stated temperature can vary by an amount of +/−5° C.

For the purposes of this invention, the term "about" in relation to percentage of power usage means that the stated percentage can vary by an amount of up to 1%.

For the purposes of this invention, the term "substantial portion" in relation to removal of an existing refrigerant from a heat transfer system means removing at least about 50% of the existing refrigerant contained in the system.

The term "capacity" is the amount of cooling provided, in BTUs/hr, by the refrigerant in the refrigeration system. This is experimentally determined by multiplying the change in enthalpy in BTU/lb, of the refrigerant as it passes through the evaporator by the mass flow rate of the refrigerant. The enthalpy can be determined from the measurement of the pressure and temperature of the refrigerant. The capacity of the refrigeration system relates to the ability to maintain an area to be cooled at a specific temperature. The capacity of a refrigerant represents the amount of cooling or heating that it provides and provides some measure of the capability of a compressor to pump quantities of heat for a given volumetric flow rate of refrigerant. In other words, given a specific compressor, a refrigerant with a higher capacity will deliver more cooling or heating power.

The phrase "coefficient of performance" (hereinafter "COP") is a universally accepted measure of refrigerant performance, especially useful in representing the relative thermodynamic efficiency of a refrigerant in a specific heating or cooling cycle involving evaporation or condensation of the refrigerant. In refrigeration engineering, this term expresses the ratio of useful refrigeration or cooling capacity to the energy applied by the compressor in compressing the vapor and therefore expresses the capability of a given compressor to pump quantities of heat for a given volumetric flow rate of a heat transfer fluid, such as a refrigerant. In other words, given a specific compressor, a refrigerant with a higher COP will deliver more cooling or heating power. One means for estimating COP of a refrigerant at specific operating conditions is from the thermodynamic properties of the refrigerant using standard refrigeration cycle analysis techniques (see for example, R. C. Downing, FLUOROCARBON REFRIGERANTS HANDBOOK, Chapter 3, Prentice-Hall, 1988 which is incorporated herein by reference in its entirety).

The phrase "discharge temperature" refers to the temperature of the refrigerant at the outlet of the compressor. The advantage of a low discharge temperature is that it permits the use of existing equipment without activation of the thermal protection aspects of the system which are preferably designed to protect compressor components and avoids the use of costly controls such as liquid injection to reduce discharge temperature.

The phrase "Global Warming Potential" (hereinafter "GWP") was developed to allow comparisons of the global warming impact of different gases. Specifically, it is a measure of how much energy the emission of one ton of a gas will absorb over a given period of time, relative to the emission of one ton of carbon dioxide. The larger the GWP, the more that a given gas warms the Earth compared to CO2 over that time period. The time period usually used for GWP is 100 years. GWP provides a common measure, which allows analysts to add up emission estimates of different gases. See http://www.protocolodemontreal.org.br/site/images/publicacoes/setor_manufatura_e quipamentos_refrigeracao_arcondicionado/Como_calcular_el_Potencial_de_Calentamiento_Atmosferico_en_las_mezclas_de_refrigerantes.pdf The term "Occupational Exposure Limit (OEL)" is determined in accordance with ASHRAE Standard 34-2016 Designation and Safety Classification of Refrigerants.

The phrase "acceptable toxicity" as used herein means the composition is classified as class "A" by ASHRAE Standard 34-2016 Designation and Safety Classification of Refrigerants and described in Appendix B1 to ASHRAE Standard 34-2016 (as each standard exists as of the filing date of this application). A substance which is non-flammable and low-toxicity would be classified as "A1" by ASHRAE Standard 34-2016 Designation and Safety Classification of Refrigerants and described in Appendix B1 to ASHRAE Standard 34-2016 (as each standard exists as of the filing date of this application).

The term "mass flow rate" is the mass of refrigerant passing through a conduit per unit of time.

As used herein, the term "replacement" means the use of a composition of the present invention in a heat transfer system that had been designed for use with or is suitable for use with another refrigerant. By way of example, when a refrigerant or heat transfer composition of the present invention is used in a heat transfer system that was designed for use with R-410A, then the refrigerant or heat transfer composition of the present invention is a replacement for R-410A in said system. It will thus be understood that the term "replacement" includes the use of the refrigerants and heat transfer compositions of the present invention in both new and existing systems that had been designed for use with, are commonly used with, or are suitable for use with R-410A.

The phrase "thermodynamic glide" applies to zeotropic refrigerant mixtures that have varying temperatures during phase change processes in the evaporator or condenser at constant pressure.

As used herein, the term "evaporator glide" means the difference between the saturation temperature of the refrigerant at the entrance to the evaporator and the dew point of the refrigerant at the exit of the evaporator, assuming the pressure at the evaporator exit is the same as the pressure at the inlet. As used herein, the phrase "saturation temperature" means the temperature at which the liquid refrigerant boils into vapor at a given pressure.

The term "low temperature refrigeration system" refers to heat transfer systems which operate with a condensing temperature of from about 20° C. to about 60° C. and evaporating temperature of from about −45° C. up to and including −12° C.

The term "medium temperature refrigeration system" refers to heat transfer systems which operate with a condensing temperature of from about 20° C. to about 60° C. and evaporating temperature of from −12° C. to about 0° C.

The term "residential air conditioning" as used herein refers to heat transfer systems to condition air (cooling or heating) which operate with a condensing temperature of from about 20° C. to about 70° C. and evaporating temperature of from about 0° C. to about 20° C.

The term "air cooled chillers" as used herein refers to heat transfer systems which transfer heat to or from process water (typically used to cool or heat the inside of buildings) and reject or absorb heat from ambient air and which operate with a condensing temperature of from about 20° C. to about 70° C. and evaporating temperature of from about 0° C. to about 10° C.

The term "supermarket refrigeration" as used herein refers to commercial refrigeration systems that are used to maintain chilled or frozen food in both product display cases and storage refrigerators.

The term "R-22" means chlorodifluoromethane.

The terms "HFC-32" and "R-32" as used herein each mean difluoromethane.

The term "R-125" means pentafluoroethane.

The term "R-134a" means #1,1,1,2-tetrafluoroethane.

The term "R-143a" means 1,1,1-trifluoroethane.

The term "R-404A" means a combination of about 44% by weight of R-125, about 52% by weight of R-143a and about 4% by weight of R-134a.

The term "R-507A" means a combination of about 50% by weight of R-125, about 50% by weight of R-143a.

The terms "HFO-1234yf" and "R-1234yf" as used herein each mean 2,3,3,3-tetrafluoropropene.

The terms "HFO-1234ze(E)," R-1234ze(E) and "1234ze (E)" as used herein each mean trans-1,3,3,3-tetrafluoropropene.

Reference herein to a group of defined items includes all such defined items, including all such items with suffix designations.

Systems and Methods

An exemplary refrigeration system of the present invention, including an exemplary existing refrigeration system to be retrofitted according to the present invention, including according to each of Retrofit Methods 1-42 is shown in FIG. 1 hereof. FIG. 1 also illustrates heat transfer methods of the present invention, including Heat Transfer Methods 1-3, and heat transfer systems, including each of Heat Transfer System 1-4. The existing system 1 comprises a compressor 10 which receives a gaseous refrigerant (also sometimes referred to as vaporous refrigerant) on a low pressure side 10A (sometimes referred to as "suction side" or "compressor inlet") and operates to produce a higher pressure gaseous refrigerant discharged on high pressure side 10B.

While compressor 10 is shown as being a single compressor and having a single inlet 10A and a single outlet 10B, the use herein of the singular "a" is generally understood to include and mean at least one. Accordingly, it will be understood that the compressor according to the present invention may include two or more compressors, and that each compressor can have two more inlets, either at the same or different pressures and also two or more outlets, once again at the same or different pressures.

As those skilled in the art will appreciate, such compressors are sometimes referred to as multistage compressors when either the inlets or outlets are at different pressures, and all such compressor types and combinations are within the scope of the present invention.

The refrigerant from the compressor 10 is in fluid communication, preferably via conduits, connectors, valves, controllers and the like, represented by line 11 in FIG. 1, with a condenser 12. In the condenser heat is removed from the vaporous refrigerant to produce a condensed liquid refrigerant, which exits the condenser via conduits, connectors, valves, controllers and the like, represented by line 13. Although not specifically illustrated in FIG. 1, it will be appreciated that the present invention includes condensers which include an internal sub-cooler which reduces the temperature of the liquid refrigerant exiting the condenser to below the bubble point of the liquid refrigerant. In addition and/or as an alternative, an external sub-cooler 14 may be included according to the present invention. The condensed liquid refrigerant is fed to a pressure reducing device 15. In a preferred but optional embodiment as shown in FIG. 1, the condensed refrigerant liquid from the condenser 12 is first subcooled via subcooler 14 prior to entering the pressure reducing device 15.

The pressure reducing device 15 produces a mixture of relatively low temperature, low pressure refrigerant liquid and gas represented by line 16 in FIG. 1. At least the cool liquid portion of the refrigerant mixture 16 from the pressure reducing device 15 is introduced, either directly or indirectly, to a flooded evaporator 20. In the process illustrated schematically in FIG. 1, the cooled liquid refrigerant is feed to the evaporator indirectly, that is, by first separating the liquid from the vaporous refrigerant in an accumulator 17, which produces a liquid refrigerant stream 18. The liquid refrigerant 18 is fed to the evaporator 20 wherein it absorbs heat by being evaporated to produce a vaporous refrigerant stream 21. The liquid refrigerant can be fed directly via conduits, connectors, valves, controllers and the like to the evaporator (using the force of gravity, for example), or indirectly via a liquid pump 19 as shown in FIG. 1.

The vaporous refrigerant 21 is fed directly or indirectly to the low pressure or suction side 10A of the compressor 10. In the embodiment illustrated in FIG. 1, the vaporous refrigerant 21 from the evaporator 20 is introduced first to the accumulator 17, wherein it combines with the vaporous refrigerant separated from refrigerant stream 16 to produce a combined vaporous stream 22 which feeds the suction side 10A of the compressor 10.

Figure 2:
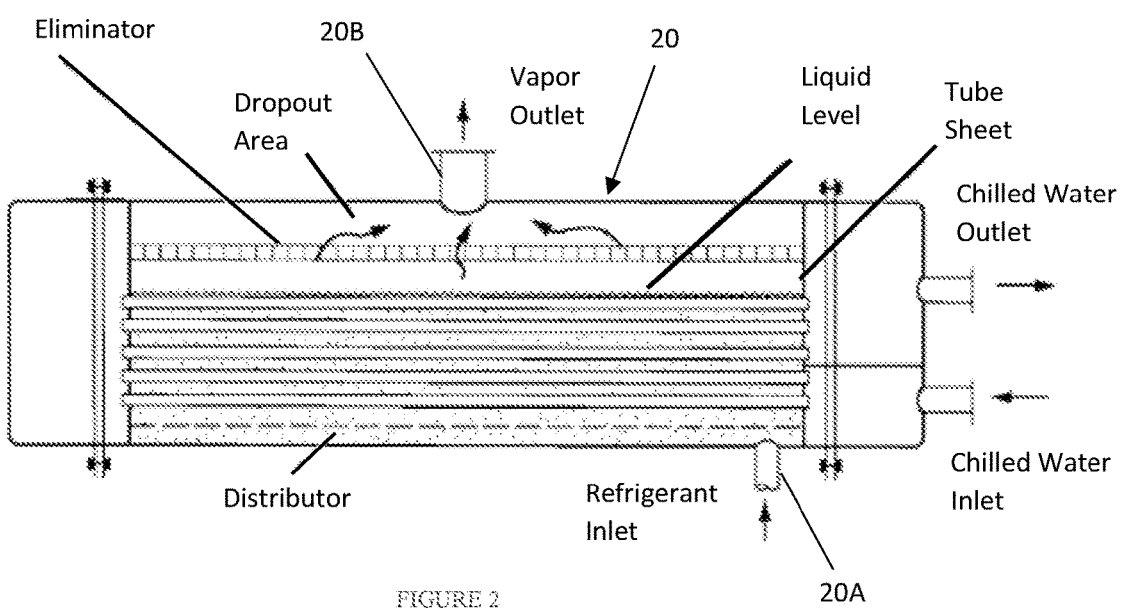
FIG. 2 is schematic representation of an exemplary flooded evaporator for use in a system according to the present invention, including a system that includes an accumulator.

An example of a flooded evaporator suitable for use with an accumulator is shown in FIG. 2. In this example, the liquid refrigerant 18 is fed directly via the force of gravity or via liquid pump 19 to the evaporator liquid inlet 20A. In a preferred embodiment as shown in FIG. 2, the evaporator is a shell and tube heat exchanger in which the liquid refrigerant is fed to the shell side of the heat exchanger and in which the tubes carrying the fluid to be cooled (shown by way of example as water in FIG. 2) are submerged. The evaporator 20 includes an outlet 20B for the vaporous refrigerant produced in the evaporator.

Figure 3:
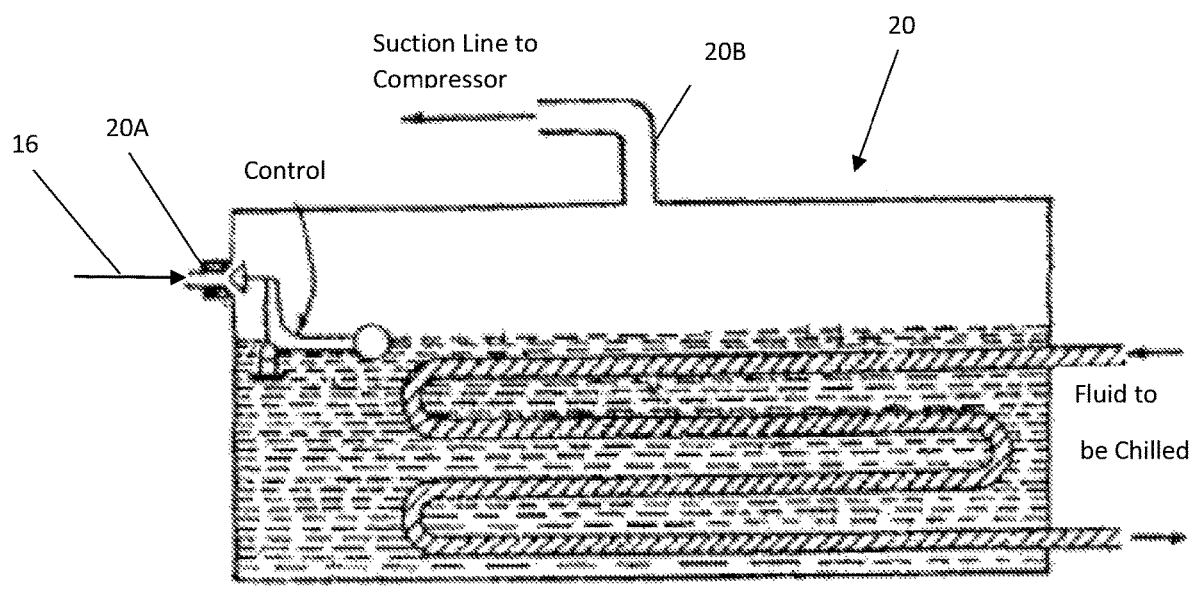
FIG. 3 is schematic representation of an exemplary flooded evaporator for use in a system according to the present invention, including a system that does not use an accumulator.

An example of a flooded evaporator suitable for use with a system without an accumulator is shown in FIG. 3. In this example, the mixture of liquid and vaporous refrigerant 16 is fed directly to the evaporator 20 via refrigerant inlet 20A. The evaporator is preferably configured such that a disengagement zone or other means are provided to allow the liquid refrigerant to separate from the vaporous refrigerant. In this embodiment the evaporator is preferably a shell and tube heat exchanger in which the liquid refrigerant is contained on the shell side and substantially submerges the coolant fluid tubes. The evaporator 20 includes an outlet 20B for the vaporous refrigerant produced in the evaporator which feeds the suction line of the compressor.

As is known to those skilled in the art, non-azeotropic compositions are those compositions which comprise a mixture of two of more substances that behave as a mixture and for which the vapor produced by partial evaporation or distillation of the liquid has a different composition from the liquid from which it is evaporated or distilled. During operation of a flooded evaporator, the liquid refrigerant in the evaporator is typically exposed to an external heat source (which may be ambient air) which causes a portion of the refrigerant composition to vaporize, thus transferring energy to the refrigerant. As a result, for non-azeotropic compositions of the present invention, the composition of the vaporous refrigerant produced in the flooded evaporator 20 will have a different composition from the liquid fraction of the liquid refrigerant within the flooded evaporator 20, defining a vaporous refrigerant leaving the evaporator for delivery, directly or indirectly, to the suction side of the compressor. Applicants have found that, notwithstanding that the present refrigerant compositions are non-azeotropic, the heat transfer methods and heat transfer systems of the present invention proved unexpectedly excellent heat transfer performance compared to other non-azeotropic refrigerant blends. In particular, applicants have found that the fractionation effect in such system can, in unpredictable and unexpected ways, produce a performance enhancement during operation of certain heat transfer systems that use a flooded evaporator, as explained in detail in hereinafter.

Heat Transfer Compositions

The compositions of the present invention, including each of Refrigerants 1-42 are generally adaptable for use in heat transfer applications, that is, as a heating and/or cooling medium, but are particularly well adapted for use, as mentioned above, in: refrigeration systems, including particularly medium and low temperature refrigeration systems; air conditioning systems, and preferably stationary and commercial air conditioning systems; and chiller systems, that have heretofore used and/or to retrofit existing systems that contain R-22A, R404A, and R507A.

Applicants have found that use of the components of the present invention within the broad and preferred ranges described herein is important to achieve the advantageous but difficult to achieve combinations of properties exhibited by the present compositions, particularly in the preferred systems and methods and particularly to retrofit existing versions of such systems that contain or have previously contained R-22A, R404A, and R507A, and that use of these same components but substantially outside of the identified ranges can have a deleterious effect on one or more of the important properties of the compositions, systems or methods of the invention.

As mentioned above, applicants have found that the compositions of the present invention are capable of achieving a difficult to achieve combination of properties, including particularly low GWP and non-flammability. By way of non-limiting example, the following Table A illustrates the substantial improvement in GWP exhibited by certain compositions for use in the present methods in comparison to the GWP of each of R-22, R-404A and R507A.

TABLE A

| Composition of the Invention (weight fraction, based on identified components) | Name | GWP | GWP as a Percentage of R22 GWP |
|---|---|---|---|
| PRIOR COMPOSITIONS | | | |
| R22 | R22 | 1810 | 100% |
| R125/R134a/R143a(0.44/0. 04/0.52) | R404A | 3922 | 217% |
| R125/R143a (0.5/0.5) | R507A | 3958 | 219% |
| COMPOSITIONS FOR METHODS OF THE INVENTION | | | |
| R32/R125/R1234yf/R134a/1234ze(0.21/0.21/0.20/0.31/0.07) | HDR157 | 1321 | 73% |
| R32/R125/R1234yf/R134a/1234ze(0.21/0.21/0.18/0.26/0.14) | HDR157-1 | | |
| R32/R125/R1234yf/R134a/1234ze(0.22/0.22/0.11/0.25/0.20) | HDR157-2 | | |
| R32/R125/R134a/1234ze(0.23/0.23/0.25/0.29) | HDR157-3 | | |
| R32/R125/R1234yf/R134a (0.20/0.20/0.31/0.29) | R4490 | 1251 | 69% |
| R32/R125/R1234yf/R134a/1234ze (0.26/0.26/0.20/0.21/0.07) | R448A | 1387 | 77% |

The the above-identified prior compositions, as well as the heat transfer compositions of the present invention, including heat transfer compostions of the invention which include the refrigerants of the present invention, including each of Refrigerants 1-13, may also include one or more other components that are included for a variety of functions and which are generally at least partially miscible with and/or carried by the refrigerant as it circulates in the system. For example, vapor compression systems to be retrofitted according to the present invention will, in many embodiments, include a lubricant for the compressor, generally in amounts of from about 30 to about 50 percent by weight of lubricant and the refrigerant in the system. In some cases the compressor lubricant is present in the system in amount greater than about 50 percent and other cases in amounts as low as about 5 percent, based on the lubricant and refrigerant in the system. Furthermore, the system may also include a compatibilizer, such as propane, for the purpose of aiding compatibility and/or solubility of the lubricant. Such compatibilizers, including propane, butanes and pentanes, are preferably present in amounts of from about 0.5 to about 5 percent by weight of the refrigerant, lubricant and compatibilizer. Combinations of surfactants and solubilizing agents may also be added to the present compositions to aid oil solubility, as disclosed by U.S. Pat. No. 6,516,837, the disclosure of which is incorporated by reference.

The compressor lubricants include polyol ester (POE) lubricants, polyvinyl ether (PVE) lubricants, polyalkylene glycol (PAG) lubricants, PAG oils, silicone oil, mineral oil, alkyl benzenes (ABs) and poly(alpha-olefin) (PAO). Commercially available mineral oils include Witco LP 250 (registered trademark) from Witco, Zerol 300 (registered trademark) from Shrieve Chemical, Sunisco 3GS from Witco, and Calumet R015 from Calumet. Commercially available alkyl benzene lubricants include Zerol 150 (registered trademark). Commercially available esters include neopentyl glycol dipelargonate, which is available as Emery 2917 (registered trademark) and Hatcol 2370 (registered trademark). Other useful esters include phosphate esters, dibasic acid esters, and fluoroesters. Preferred lubricants are POEs and PVEs. Of course, different mixtures of different types of lubricants may be used.

Other additives not mentioned herein can also be included by those skilled in the art in view of the teachings contained herein without departing from the novel and basic features of the present invention.

The refrigerants of the invention include refrigerants which comprise, consist essentially of, or consist of the components within the ranges indicated in the Table below, with all values understood to be "about" as defined herein:

| Component | Range, Wt % | | | | | | |
|---|---|---|---|---|---|---|---|
| R-134a | 26-31 | 26-30 | 27-31 | 27-30 | 28-31 | 28-30 | 26-31 |
| R-1234ze(E) | 7-29 | 7-20 | 7-14 | 14-29 | 14-20 | 7-14 | 7-29 |
| R-1234yf | 2-22.5 | 2-20 | 2-18 | 2-11 | 11-21.5 | 18-22.5 | 2-22.5 |
| R-32 | 20-24 | 20-24 | 20-24 | 20-24 | 20-24 | 20-24 | 21-23 |
| R-125 | 20-24 | 20-24 | 20-24 | 20-24 | 20-24 | 20-24 | 21-23 |
| Refrigerant No. | 1A | 1B | 1C | 1D | 1E | 1F | 1G |

Heat Transfer Methods and Systems

The present methods and systems are useful in connection with a wide variety of heat transfer systems, including: refrigeration systems, and preferably in low temperature and medium temperature refrigeration; air conditioning systems, including stationary, commercial and mobile air conditioning systems; and chillers, and in particular to retrofit of such systems.

As used herein, the term retrofit means that use of the refrigerant added according to the methods hereof, including each of Retrofit Methods 1-42, is achieved without the need to replace major items of equipment, such as compressors, condensers, flooded evaporators, and accumulators when present. In addition, it is preferred that retrofit methods of the present invention including each of Retrofit Methods 1-42, comprise not changing or replacing the expansion device, such as expansion valves, and also not replacing or changing the refrigerant sub-cooler if present.

Low temperature refrigeration systems are important in many applications, such as to the food manufacture, distribution and retail industries. Such systems play a vital role in ensuring that food which reaches the consumer is both fresh and fit to eat. In such low temperature refrigeration systems, the refrigerant liquids which have been used and/or are in use in such systems include R-22, R-404A and R-507A, each of which has a Global Warming Potential (GWP) of well above 1500. Applicants have found that the compositions, systems and methods of the present invention satisfy in an exceptional and unexpected way the need for alternatives and/or replacements for refrigerants in such low temperature applications, particularly and preferably for systems that have been operating with and/or contain R-22, R-404A and/or R-507A, and the present invention provides a drop-in replacement or retrofit of such systems that at once have lower GWP values and provide substantially non-flammable, non-toxic fluids that have a match in compressor power consumption that do not require the compressor to be replaced as part of the retrofit, and which preferably do not require any of the major components of the system to be replaced.

As used herein the term "low temperature refrigeration system" refers to vapor compression refrigeration systems which utilize one or more compressors, condensers and evaporators that operate with an average evaporator temperature in the range of about −60° C. to about −12° C. In preferred embodiments, the low temperature refrigeration system operates with an average condenser temperature in the range of from about 35° C. to about 45° C. In preferred embodiments of such systems, the systems have an average evaporator temperature of from about −40° C. and less than about −12° C., more preferably from about −35° C. to about −25° C., with an evaporator temperature preferably of about −32° C.

The present invention may also encompass medium temperature refrigeration composition, systems and methods. As used herein the term "medium temperature refrigeration system" refers to vapor compression refrigeration systems which utilize one or more compressors, condensers and evaporators that operate with an average evaporator temperature in the range of about −12° C. to about 5° C. An example of such a medium temperature system and method involves providing cooling in the fresh food compartment of a residential refrigerator.

In preferred embodiments, the compositions, systems and methods of the present invention are used in refrigeration systems originally designed for use, and which preferably contains and/or has been in operation with R-22, R-404A and/or R507A as the refrigerant. The preferred retrofit methods of the present invention have the unexpected advantage of at once providing the desirable ability of achieving a refrigerant GWP that is substantially lower than that of each of R-22, R404A and R507A, preferably having a GWP of less than 1350, while at the same time being non-flammable and having a compressor power consumption that is 115% or less, preferably 110% or less, and even more preferably that is 105% or less, than the compressor power consumption when R-22 is the refrigerant in the system. Also, the present methods provide a post-retrofit system capacity that is 90% or greater than the capacity of R-22 in the system and also preferably at the same time achieving a mass flow rate that is less than 105%, more preferably about 100% or less, than mass flow rate with R-22 in the system.

Applicants have recognized that certain preferred embodiments of the present compositions tend to exhibit relatively low global warming potentials ("GWPs"), preferably less than about 1500, more preferably less than about 1400, and even more preferably not greater than about 1350.

EXAMPLES

The following examples are provided for the purpose of illustrating the present invention but without limiting the scope thereof.

Example 1: Performance Parameters

The compressor power required to operate with a given refrigerant in a given service is an in important parameter in retrofit applications since it has a relationship to whether an existing system can be retrofitted with a new refrigerant without the need to replace the compressor, which is one of the more expensive items in refrigeration systems. One standard which can be used in this regard is the ability of a potential retrofit refrigerant to operate, without changing any of the major components, in the system with a compressor power that is 115% or less than the compressor power of the existing system in the refrigerant. This value has some commercial significance because it is the value that R507A has achieved as a replacement for R22 in many applications.

The coefficient of performance (COP) is a universally accepted measure of refrigerant performance, especially useful in representing the relative thermodynamic efficiency of a refrigerant in a specific heating or cooling cycle involving evaporation or condensation of the refrigerant. In refrigeration engineering, this term expresses the ratio of useful refrigeration to the energy applied by the compressor in compressing the vapor. One means for estimating COP of a refrigerant at specific operating conditions is from the thermodynamic properties of the refrigerant using standard refrigeration cycle analysis techniques (see for example, R. C. Downing, FLUOROCARBON REFRIGERANTS HANDBOOK, Chapter 3, Prentice-Hall, 1988).

The capacity of a refrigerant represents the amount of cooling or heating it provides and provides some measure of the capability of a compressor to pump quantities of heat for a given volumetric flow rate of refrigerant. In other words, given a specific compressor, a refrigerant with a higher capacity will deliver more cooling or heating power. This measure is also relevant to retrofit applications since if the capacity is too low it may not be possible to achieve the necessary degree of cooling with the existing equipment.

The mass flow rate of refrigerant is another potentially important measure of performance in retrofit applications since if the mass flow rate of the new refrigerant in the system is too high, the ability to operate without changing a major component may be called into question.

Example 1A-R-22 Low Temperature Refrigeration Retrofit

A low temperature refrigeration system is provided and has the configuration illustrated generally in FIG. 1, with the following notations and exceptions: (1) a subcooler is not included; (2) the heat from the condenser is rejected to a heat sink in the form of ambient air blown across the condenser coils; and (3) the evaporator 20 comprises three shell and tube, flooded evaporators of the type illustrated generally in FIG. 2 which are connected in parallel and fed at an overfeed ratio of 4:1. The condenser temperature is set to 105° F. (40.55° C.), which generally corresponds to an outdoor temperature of about 35° C. The evaporating temperature is set to −25° F. (−31.6° C.). The degree of superheat at the suction inlet set to 10° F., and the compressor operates at a compression ratio of 3:1 and efficiency is set to 60%. The pressure drop and heat transfer in the connecting lines (suction and liquid lines) are considered negligible, and heat leakage through the compressor shell is ignored. Several operating parameters are determined for compositions according to the present invention (HDR157 and R449C), each of which is nonflammable and has very low toxicity. Comparative examples using refrigerant R-449A (24.3 wt % of R32, 24.7 wt % of R125, 25.3 wt % R1234yf; and 25.7 wt % R-134a) and R-448A (26 wt % of R32, 26 wt % of R125, 20 wt % R1234yf; 21 wt % R-134a; and 7 wt % of 1234ze(E)), which are not within the retrofit methods of the present invention, are also also provided.

For this example, the existing refrigerant is R-22, and the performance of the system with the replacement refrigerant (as a % of R-22 performance, except for discharge temperature) after all of the R-22 is removed from the system and replaced by the indicated refrigerant is reported in Table 1A below:

TABLE 1A

| Refrigerant | GWP | Comp. Power | Capacity | Efficiency | Disch, Press. | Mass Flow | Disch. Temp., °F. |
|---|---|---|---|---|---|---|---|
| R22 | 1810 | 100% | 100% | 100% | 100% | 100% | 275.6 |
| Comparative Data |
| R449A | 1397 | 114% | 99% | 87% | 128% | 108% | 238.4 |
| R448A | 1387 | 117% | 101% | 87% | 130% | 107% | 242.8 |
| Embodiments of the Invention |
| HDR157 | 1321 | 105% | 91% | 86% | 121% | 99% | 238.2 |
| HDR157-1 | 1250 | 105% | 90% | 86% | 121% | 97% | 239.7 |
| HDR157-2 | 1278 | 105% | 90% | 86% | 122% | 95% | 245.1 |
| HDR157-3 | 1320 | 104% | 90% | 86% | 122% | 91% | 254.0 |
| R4490 | 1251 | 106% | 91% | 86% | 121% | 102% | 231.9 |

As can be seen from the results reported above, the comparative refrigerants for this Example (R449A and R448A) is shown to produce a power consumption in low temperature refrigeration that is greater than 110%, whereas each of the embodiments of the present invention achieve a very substantial and an unexpected advantage in power consumption of 106% or less, with each of the HDR157 refrigerants achieving 105% or less. Importantly, the embodiments of the present invention each achieve a mass flow rate that is unexpectedly superior (102% or less), compared to the comparative data for R449A and R448A which have an unacceptably high mass flow rates of 108% and 107%, respectively. In addition, the comparative refrigerants (R449A and R448A) are each shown to produce a discharge pressure that is 128% and 130% respectively, whereas the methods of the present invention using HDR-157, HDR-157-1 and HDR-157-2 achieve a very substantial and an unexpected advantage in discharge pressure of 122% or less.

While not being bound to or by any particular theory of operation, it is believed that the fractionation characteristics of the refrigerants used in accordance with present retrofit method and heat transfer methods contribute to the unexpected results achieved by the present invention. In particular, the following table provides the concentration of the components in the liquid phase and in the vapor phase in the flooded evaporator for the refrigerants in Tables 1B1, 1B2, 1B3 and 1B4 below when used in low temperature refrigeration systems and medium temperature refrigeration systems.

TABLE 1B1

FRACTIONATED FLUID COMPOSITION - HDR-157

| FLUID | LIQUID (wt %) | | VAPOR (wt %) | |
|---|---|---|---|---|
| R32 | 11.6% | 18.5% | 24.8% | 33.6% |
| R1234yf | 20.7% | 21.8% | 16.9% | 19.3% |
| R125 | 15.1% | 19.8% | 23.3% | 27.2% |
| R134a | 33.3% | 41.5% | 18.6% | 27.1% |
| R1234ze | 7.7% | 10.4% | 3.7% | 5.7% |

TABLE 1B2

FRACTIONATED FLUID COMPOSITION - R449C

| FLUID | LIQUID, wt % | | VAPOR, wt % | |
|---|---|---|---|---|
| R32 | 11.1% | 17.6% | 23.6% | 32.1% |
| R1234yf | 32.3% | 35.0% | 25.1% | 29.2% |
| R125 | 14.8% | 18.9% | 22.0% | 25.5% |
| R134a | 31.2% | 39.2% | 17.3% | 25.2% |
| R1234ze | 0.0% | 0.0% | 0.0% | 0.0% |

TABLE 1B3

FRACTIONATED FLUID COMPOSITION - R448A

| FLUID | LIQUID, wt % | | VAPOR, wt % | |
|---|---|---|---|---|
| R32 | 15.8% | 23.6% | 30.1% | 38.3% |
| R1234yf | 20.9% | 23.0% | 15.7% | 18.6% |
| R125 | 20.4% | 25.0% | 28.2% | 31.1% |
| R134a | 22.8% | 29.9% | 11.5% | 17.7% |
| R1234ze | 7.7% | 10.9% | 3.4% | 5.5% |

TABLE 1B4

FRACTIONATED FLUID COMPOSITION - HDR-157-1

| FLUID | LIQUID | | VAPOR | |
|---|---|---|---|---|
| R32 | 11.1% | 18.4% | 25.0% | 34.4% |
| R1234yf | 18.6% | 19.3% | 15.3% | 17.5% |
| R125 | 15.0% | 19.8% | 23.4% | 27.3% |
| R134a | 27.9% | 34.2% | 15.7% | 22.9% |
| R1234ze | 15.3% | 20.8% | 7.3% | 11.3% |

TABLE 1B5

FRACTIONATED FLUID COMPOSITION - HDR157-2

| FLUID | LIQUID | | VAPOR | |
|---|---|---|---|---|
| R32 | 11.4% | 19.3% | 26.3% | 36.1% |
| R1234yf | 11.2% | 11.5% | 9.6% | 10.9% |
| R125 | 15.4% | 20.7% | 24.6% | 28.8% |
| R134a | 26.8% | 32.5% | 15.2% | 22.2% |
| R1234ze | 21.9% | 29.5% | 10.4% | 16.2% |

TABLE 1B6

FRACTIONATED FLUID COMPOSITION - HDR-157-3

| FLUID | LIQUID | | VAPOR | |
|---|---|---|---|---|
| R32 | 12.0% | 20.1% | 27.7% | 38.4% |
| R1234yf | 0.0% | 0.0% | 0.0% | 0.0% |
| R125 | 16.0% | 21.5% | 26.0% | 30.9% |

TABLE 1B6-continued

FRACTIONATED FLUID COMPOSITION - HDR-157-3

| FLUID | LIQUID | | VAPOR | |
|---|---|---|---|---|
| R134a | 26.8% | 31.1% | 15.5% | 22.5% |
| R1234ze | 31.7% | 40.8% | 15.2% | 23.7% |

Example 1B—R-404A Low Temperature Refrigeration Retrofit

Example 1A is repeated, except the existing refrigerant is R-404A. Similar and unexpectedly advantageous results are achieved.

Example 1C—R-507A Low Temperature Refrigeration Retrofit

Example 1A is repeated, except the existing refrigerant is R507A. Similar and unexpectedly advantageous results are achieved.

Example 2A-R-22 Medium Temperature Refrigeration Retrofit

A medium temperature refrigeration system is provided and has the configuration illustrated generally in FIG. 1, with the following notations and exceptions: (1) a subcooler is not included; (2) the heat from the condenser is rejected to a heat sink in the form of ambient air blown across the condenser coils; and (3) the evaporator 20 comprises three (3) shell and tube, flooded evaporators of the type illustrated generally in FIG. 2 which are connected in parallel and fed at an overfeed ratio of 4:1. The condenser temperature is set to 105° F. (40.55° C.), which generally corresponds to an outdoor temperature of about 35° C. The evaporating temperature is set to 20° F. (−6.7° C.). The degree of superheat at the suction inlet is set to 10° F., and the compressor operates at a compression ratio of 3:1 with an efficiency of 60%. The pressure drop and heat transfer in the connecting lines (suction and liquid lines) are considered negligible, and heat leakage through the compressor shell is ignored. Several operating parameters are determined for compositions according to the present invention (HDR157 and R449C), each of which is nonflammable and has very low toxicity. Comparative examples using refrigerant R-449A (24.3 wt % of R32, 24.7 wt % of R125, 25.3 wt % R1234yf; and 25.7 wt % R-134a) and R-448A (26 wt % of R32, 26 wt % of R125, 20 wt % R1234yf; 21 wt % R-134a; and 7 wt % of 1234ze(E)), which are not within the retrofit methods of the present invention, are also provided.

For this example, the existing refrigerant is R-22, and the performance of the system with the replacement refrigerant (as a % of R-22 performance, except for discharge temperature) after all of the R-22 is removed from the system and replaced by the indicated refrigerant is reported in Table 2A below:

TABLE 2A

| Refrigerant | GWP | Comp. Power | Capacity | Efficiency | Disch. Press. | Mass Flow | Disch. Temp., ° F. |
|---|---|---|---|---|---|---|---|
| R22 | 1810 | 100% | 100% | 100% | 100% | 100% | 204.4 |
| | | | Comparative Data | | | | |
| R449A | 1397 | 119% | 103% | 87% | 126% | 110% | 185.4 |
| R448A | 1387 | 121% | 104% | 86% | 128% | 110% | 187.8 |

TABLE 2A-continued

| Refrigerant | GWP | Comp. Power | Capacity | Efficiency | Disch. Press. | Mass Flow | Disch. Temp., ° F. |
|---|---|---|---|---|---|---|---|
| | | Embodiments of the Invention | | | | | |
| HDR157 | 1321 | 111% | 95% | 86% | 119% | 101% | 185.7 |
| HDR157-1 | 1250 | 110% | 95% | 86% | 119% | 100% | 186.5 |
| HDR157-2 | 1278 | 111% | 95% | 86% | 119% | 98% | 189.6 |
| HDR157-3 | 1320 | 111% | 94% | 85% | 119% | 94% | 194.8 |
| R449C | 1251 | 111% | 96% | 86% | 119% | 104% | 182.0 |

As can be seen from the results reported above, the comparative refrigerants (R449A and R448A) are shown to produce a power consumption in medium temperature refrigeration that is much greater than 115%, whereas each of the embodiments of the present invention achieve a very substantial and an unexpected advantage in power consumption of 111% or less, with HDR157 each achieving 110%. Importantly, the embodiments of the present invention each achieve a mass flow rate that is unexpectedly superior (104% or less), compared to the comparative data for R449A and R448A which have an unacceptably high mass flow rates of d 110%. In addition, the comparative refrigerants are shown to produce a discharge pressure that is 126% or higher, whereas each of the embodiments of the present invention achieve a very substantial and an unexpected advantage in discharge pressure of less than 120%.

While not being bound to or by any particular theory of operation, it is believed that the fractionation characteristics of the refrigerants used in accordance with present retrofit method and heat transfer methods contribute to the unexpected results achieved by the present invention. In particular, the following table provides the concentration of the components in the liquid phase and in the vapor phase in the flooded evaporator for the refrigerants in Tables 1B1, 1B2, 1B3 and 1B4 above.

Example 2B—R-404A Medium Temperature Refrigeration Retrofit

Example 2A is repeated, except the existing refrigerant is R-404A. Similar and unexpectedly advantageous results are achieved.

Example 2C—R-507A Medium Temperature Refrigeration Retrofit

Example 2A is repeated, except the existing refrigerant is R507A. Similar and unexpectedly advantageous results are achieved.

Example 3A-R-22 Chiller Retrofit

A chiller system is provided and has the configuration illustrated generally in FIG. 1, with the following notations and exceptions: (1) a subcooler is not included; (2) the heat from the condenser is rejected to a heat sink in the form of ambient air blown across the condenser coils; and (3) the evaporator 20 comprises three (3) shell and tube, flooded evaporators of the type illustrated generally in FIG. 2 which are connected in parallel and fed at an overfeed ratio of 4:1. The condenser temperature is set to 105° F. (40.55° C.), which generally corresponds to an outdoor temperature of about 35° C. The evaporating temperature is set to 41° F. (5° C.). The degree of superheat at the suction inlet is set to 10° F., and the compressor operates at a compression ratio of 3:1 with an efficiency of 60%. The pressure drop and heat transfer in the connecting lines (suction and liquid lines) are considered negligible, and heat leakage through the compressor shell is ignored. Several operating parameters are determined for compositions according to the present invention (HDR157 and R449C), each of which is nonflammable and has very low toxicity. A comparative example using refrigerant R-449A (24.3 wt % of R32, 24.7 wt % of R125, 25.3 wt % R1234yf; and 25.7 wt % R-134a), which is not within the retrofit methods of the present invention, is also is also provided.

For this example, the existing refrigerant is R-22, and the performance of the system with the replacement refrigerant (as a % of R-22 performance, except for discharge temperature) after all of the R-22 is removed from the system and replaced by the indicated refrigerant is reported in Table 3 below:

TABLE 3

| Refrigerant | GWP | Comp. Power | Capacity | Efficiency | Disch. Press. | Mass Flow | Disch. Temp., ° F. |
|---|---|---|---|---|---|---|---|
| R22 | 1810 | 100% | 100% | 100% | 100% | 100% | 177.8 |
| | | | Comparative Data | | | | |
| R449A | 1397 | 122% | 105% | 86% | 125% | 111% | 166.1 |
| R448A | 1387 | 124% | 106% | 85% | 127% | 111% | 168.0 |
| | | | Embodiments of the Invention | | | | |
| HDR157 | 1321 | 115% | 98% | 85% | 118% | 103% | 166.6 |
| HDR157-1 | 1250 | 114% | 97% | 85% | 117% | 102% | 167.4 |
| HDR157-2 | 1278 | 115% | 97% | 84% | 118% | 100% | 169.7 |
| HDR157-3 | 1320 | 115% | 96% | 84% | 118% | 96% | 173.6 |
| R449C | 1251 | 114% | 98% | 86% | 118% | 106% | 163.9 |

As can be seen from the results reported above, the comparative refrigerant (R449A) is shown to produce a power consumption in medium temperature refrigeration that is greater than 120%, whereas each of the embodiments of the present invention achieves a very substantial and an unexpected advantage in power consumption of 115% or less. In addition, the comparative refrigerant (R449A) is shown to produce a discharge pressure that is 125%, whereas each of the embodiments of the present invention achieve a very substantial and an unexpected advantage in discharge pressure of less than 120%.

Example 3B—R-404A Chiller Retrofit

Example 3A is repeated, except the existing refrigerant is R-404A. Similar and unexpectedly advantageous results are achieved.

Example 3C—R-507A Chiller Retrofit

Example 3A is repeated, except the existing refrigerant is R507A.

Example 4A-R-22 Stationary Air Conditioner Retrofit

A stationary air conditioning system is provided and has the configuration illustrated generally in FIG. 1, with the following notations and exceptions: (1) a subcooler is not included; (2) the heat from the condenser is rejected to a heat sink in the form of ambient air blown across the condenser coils; and (3) the evaporator 20 comprises three (3) shell and tube, flooded evaporators of the type illustrated generally in FIG. 2 which are connected in parallel and fed at an overfeed ratio of 4:1. The condenser temperature is set to 105° F. (40.55° C.), which generally corresponds to an outdoor temperature of about 35° C. The evaporating temperature is set to 50° F. (10° C.). The degree of superheat at the suction inlet is set to 10° F., and the compressor operates at a compression ratio of 3:1 with an efficiency of 60%. The pressure drop and heat transfer in the connecting lines (suction and liquid lines) are considered negligible, and heat leakage through the compressor shell is ignored. Several operating parameters are determined for compositions according to the present invention (HDR157 and R449C), each of which is nonflammable and has very low toxicity. A comparative example using refrigerant R-449A (24.3 wt % of R32, 24.7 wt % of R125, 25.3 wt % R1234yf; and 25.7 wt % R-134a), which is not within the retrofit methods of the present invention, is also is also provided.

For this example, the existing refrigerant is R-22, and the performance of the system with the replacement refrigerant (as a % of R-22 performance, except for discharge temperature) after all of the R-22 is removed from the system and replaced by the indicated refrigerant is reported in Table 4 below:

TABLE 4

| Refrigerant | GWP | Comp. Power | Capacity | Efficiency | Disch Press. | Mass Flow | Disch Temp., ° F. |
|---|---|---|---|---|---|---|---|
| R22 | 1810 | 100% | 100% | 100% | 100% | 100% | 167.4 |
| | | | Comparative Data | | | | |
| R449A | 1397 | 124% | 105% | 85% | 125% | 112% | 158.7 |
| R448A | 1387 | 126% | 107% | 85% | 127% | 111% | 160.3 |
| | | | Embodiments of the Invention | | | | |
| HDR157 | 1321 | 117% | 99% | 84% | 117% | 104% | 159.3 |
| HDR157-1 | 1250 | 117% | 98% | 84% | 117% | 102% | 160.0 |
| HDR157-2 | 1278 | 118% | 98% | 83% | 118% | 101% | 162.1 |
| HDR157-3 | 1320 | 118% | 97% | 82% | 117% | 97% | 165.5 |
| R449C | 1251 | 116% | 99% | 85% | 117% | 106% | 156.9 |

As can be seen from the results reported above, the comparative refrigerant (R449A) is shown to produce a power consumption in air conditioning applications that is 124%, whereas each of the embodiments of the present invention achieve a very substantial and an unexpected advantage in power consumption of 117% or less. In addition, the comparative refrigerant (R449A) is shown to produce a discharge pressure that is 125%, whereas each of the embodiments of the present invention achieve a very substantial and an unexpected advantage in discharge pressure of less than 120%.

Example 4B—R-404A Stationary Air Conditioning Retrofit

Example 4A is repeated, except the existing refrigerant is R-404A. Similar and unexpectedly advantageous results are achieved.

Example 4C—R-507A Stationary Air Conditioning Retrofit

Example 4C is repeated, except the existing refrigerant is R507A. Similar and unexpectedly advantageous results are achieved.

The invention claimed is:

1. A method for retrofitting an existing heat transfer system selected from refrigerant systems, air conditioning systems and chiller systems, said method comprising:
   (a) providing an existing vapor compression system comprising:
      (i) a refrigerant in the existing vapor compression system, said refrigerant being selected from the group consisting of R-22, R404A, and R507A;
      (ii) a compressor having a compressor inlet receiving refrigerant vapor at a first pressure and a compressor outlet discharging refrigerant vapor at second pressure higher than said first pressure;
      (iii) a condenser which receives said refrigerant vapor discharged from said compressor and which transfers heat out of said refrigerant vapor to produce liquid refrigerant;
      (iv) an expansion device which receives liquid refrigerant from said condenser and produces a mixture of liquid refrigerant and refrigerant vapor at a pressure below said second pressure;
      (v) a flooded evaporator receiving: (1) said mixture of liquid refrigerant and refrigerant vapor from said pressure reducer; and/or (2) said liquid refrigerant stream from said accumulator when present, wherein said flooded evaporator produces refrigerant vapor feeding said compressor inlet;
   (b) removing at least a substantial portion of the existing refrigerant from the existing vapor compression system; and
   (c) after said removing step, adding to said existing system a refrigerant consisting essentially of:
      (i) from about 25% to about 45% by weight of 1,1,1,2-tetrafluoroethane (HFC-134a);
      (ii) from 25% to about 35% by weight of trans-1,3,3,3-tetrafluoropropene (HFO-1234ze(E)) and/or 2,3,3,3-tetrafluoropropene (HFO-1234yf); and
      (iii) from about 37% to about 46% by weight of a combination of difluoromethane (HFC-32) and pentafluoroethane (HFC-125), provided that the weight ratio of HFO-32:HFC-125 is from about 1.21:1 to about 0.8:1,
      and further provided that said refrigerant is a non-flammable refrigerant and that said refrigerant has a GWP of 1350 or less, wherein said refrigerant has a compressor power consumption that is 115% or less than the power consumption of R-22 in said existing vapor compression system.

2. The method of claim 1 wherein refrigerant consists essentially of
   (i) from about 30% to about 45% by weight of 1,1,1,2-tetrafluoroethane (HFC-134a);
   (ii) from 25% to about 35% by weight of a combination of trans-1,3,3,3-tetrafluoropropene (HFO-1234ze(E)) and 2,3,3,3-tetrafluoropropene (HFO-1234yf), provided that the weight ratio of HFO-1234yf:HFO-1234ze(E) is from about 5:1 to about 2:1; and
   (iii) from about 40% to about 46% by weight of a combination of difluoromethane (HFC-32) and pentafluoroethane (HFC-125), provided that the weight ratio of HFO-32:HFC-125 is from about 1.21:1 to about 0.8:1.

3. The method of claim 1, wherein said refrigerant consists essentially of:
   (i) about 31% by weight of 1,1,1,2-tetrafluoroethane (HFC-134a);
   (ii) about 27% by weight of a combination of trans-1,3,3,3-tetrafluoropropene (HFO-1234ze(E)) and 2,3,3,3-tetrafluoropropene (HFO-1234yf), provided that the weight ratio of HFO-1234yf:HFO-1234ze(E) is from about 5:1 to about 2:1; and
   (iii) about 42% by weight of a combination of difluoromethane (HFC-32) and pentafluoroethane (HFC-125), provided that the weight ratio of HFO-32:HFC-125 is from about 1.21:1 to about 0.8:1.

4. The method of claim 1, wherein said refrigerant consists essentially of:
   (i) about 25% to about 31% by weight of 1,1,1,2-tetrafluoroethane (HFC-134a);
   (ii) from 27% to about 32% by weight of a combination of trans-1,3,3,3-tetrafluoropropene (HFO-1234ze(E)) and optionally 2,3,3,3-tetrafluoropropene (HFO-1234yf), provided that the refrigerant comprises at least 6.5% by weight of 1234ze(E);
   (iii) about 22% by weight of difluoromethane (HFC-32); and
   (iv) about 22% by weight of pentafluoroethane (HFC-125), provided that said refrigerant is a non-flammable refrigerant.

5. The method of claim 1, wherein said refrigerant consists essentially of:
   (i) about 29% by weight of 1,1,1,2-tetrafluoroethane (HFC-134a);
   (ii) about 31% by weight of 2,3,3,3-tetrafluoropropene (HFO-1234yf),
   (iii) about 20% by weight of difluoromethane (HFC-32); and
   (iv) about 20% by weight of pentafluoroethane (HFC-125).

6. The method of claim 1, wherein said refrigerant consists essentially of:
   (i) about 31% by weight of 1,1,1,2-tetrafluoroethane (HFC-134a);
   (ii) about 20% by weight of 2,3,3,3-tetrafluoropropene (HFO-1234yf);
   (iii) about 7% by weight of trans-1,3,3,3-tetrafluoropropene (HFO-1234ze(E));
   (iv) about 21% by weight of difluoromethane (HFC-32); and
   (v) about 21% by weight of pentafluoroethane (HFC-125).

7. The method of claim 1, wherein said refrigerant consists essentially of:
   (i) about 26% by weight of 1,1,1,2-tetrafluoroethane (HFC-134a);
   (ii) about 18% by weight of 2,3,3,3-tetrafluoropropene (HFO-1234yf);
   (iii) about 14% by weight of trans-1,3,3,3-tetrafluoropropene (HFO-1234ze(E));
   (iv) about 21% by weight of difluoromethane (HFC-32); and
   (v) about 21% by weight of pentafluoroethane (HFC-125).

8. The method of claim 1, wherein said refrigerant consists essentially of:
   (i) about 25% by weight of 1,1,1,2-tetrafluoroethane (HFC-134a);
   (ii) about 11% by weight of 2,3,3,3-tetrafluoropropene (HFO-1234yf);
   (iii) about 20% by weight of trans-1,3,3,3-tetrafluoropropene (HFO-1234ze(E));
   (iv) about 22% by weight of difluoromethane (HFC-32); and (v) about 22% by weight of pentafluoroethane (HFC-125).

9. The method of claim 1, wherein said refrigerant consists essentially of:
   (i) about 25% by weight of 1,1,1,2-tetrafluoroethane (HFC-134a);
   (ii) about 29% by weight of trans-1,3,3,3-tetrafluoropropene (HFO-1234ze(E));
   (iii) about 23% by weight of difluoromethane (HFC-32); and
   (v) about 23% by weight of pentafluoroethane (HFC-125).

10. The method of claim 1 wherein said existing vapor compression system further comprises an accumulator which receives said mixture from said pressure reducer, separates said refrigerant vapor from said liquid refrigerant, and produces a liquid refrigerant stream and a refrigerant vapor stream, wherein said refrigerant vapor from said accumulator feeds said compressor inlet.

11. A refrigerant composition consisting essentially of: (a) from about 25% to about 31% by weight of 1,1,1,2-tetrafluoroethane (HFC-134a); (b) from about 27% to about 32% by weight of trans-1,3,3,3-tetrafluoropropene (HFO-1234ze(E)) and/or 2,3,3,3-tetrafluoropropene (HFO-1234yf), provided that the composition comprises no more than about 22 wt % of HFO-1234yf; and (c) from 41.5% to about 46% by weight of a combination of difluoromethane (HFC-32) and pentafluoroethane (HFC-125), provided that the weight ratio of HFO-32:HFC-125 is from about 1.21:1 to about 0.8:1.

12. The refrigerant of claim 11, further provided that the composition comprises at least about 6.5% by weight of HFO-1234ze(E).

13. A method for cooling comprising:
   (a) providing a compression refrigeration system comprising: (i) a liquid refrigerant and a refrigerant; (ii) a compressor receiving said gaseous refrigerant at a first pressure and producing gaseous refrigerant at second pressure above said first pressure; (ii) a condenser which receives gaseous refrigerant exiting said compressor and which rejects heat from said gaseous refrigerant to produce said liquid refrigerant; (iii) a pressure reducer receiving said liquid refrigerant from said condenser and producing a mixture of said liquid and said gaseous refrigerant at a pressure below said second pressure; and (iv) a flooded evaporator receiving said liquid refrigerant from said pressure reducer and/or said accumulator when present and producing said gaseous refrigerant which flows to the low pressure side of said compressor and/or to the accumulator when present;
   (b) evaporating said liquid refrigerant in said flooded evaporator to produce vaporous refrigerant, wherein: (1) said liquid refrigerant in said flooded evaporator consists essentially of, on a weight basis with a tolerance of +/−0.5%: (i) from 22.8% to 41.5% of HFC-134a; (ii) from 20.7% to 23% of HFO-1234yf; (iii) from 7.7% to 10.9% of HFO-1234ze(E); (iv) from 11.6% to 23.6% of HFC-32; and (v) 15.1% to 25.0% of HFC-125; and (2) said vaporous refrigerant in said flooded evaporator consists essentially of, on a weight basis with a tolerance of +/−0.5%: (i) from 11.5% to 27.1% of HFC-134a; (ii) from 15.7% to 19.3% of HFO-1234yf; (iii) from 3.4% to 5.7% of HFO-1234ze(E); (iv) from 24.8% to 23.6% of HFC-32; and (iv) 23.3% to 31.1% of HFC-125; and
   (c) operating said compression refrigeration system at a capacity of at least about 90% relative to R-22 in said system and wherein said compressor has a power consumption that is less than about 115% of the power consumption of R-22 in said system.

14. The method of claim 13 wherein: (1) said liquid refrigerant in said flooded evaporator consists essentially of, on a weight basis with a tolerance of +/−0.5%: (i) from 33.3% to 41.5% of HFC-134a; (ii) from 20.7% to 21.8% of HFO-1234yf; (iii) from 7.7% to 10.4% of HFO-1234ze(E); (iv) from 11.6% to 18.5% of HFC-32; and (v) 15.1% to 19.8% of HFC-125; and (2) said vaporous refrigerant in said flooded evaporator consists essentially of, on a weight basis with a tolerance of +/−0.5%: (i) from 18.6% to 27.1% of HFC-134a; (ii) from 16.9% to 19.3% of HFO-1234yf; (iii) from 3.7% to 5.7% of HFO-1234ze(E); (iv) from 24.8% to 33.6% of HFC-32; and (v) 23.3% to 27.2% of HFC-125.

15. The method of claim 13 wherein: (1) said liquid refrigerant in said flooded evaporator consists essentially of, on a weight basis with a tolerance of +/−0.5%: (i) from 31.2% to 39.2% of HFC-134a; (ii) from 32.3% to 35.0% of HFO-1234yf; (iii) from 11.1% to 17.6% of HFC-32; and (iv) 14.8% to 18.9% of HFC-125; and (2) said vaporous refrigerant in said flooded evaporator consists essentially of, on a weight basis with a tolerance of +/−0.5%: (i) from 11.5% to 17.7% of HFC-134a; (ii) from 15.7% to 18.6% of HFO-1234yf; (iii) from 3.4% to 5.5% of HFO-1234ze(E); (iv) from 30.1% to 38.3% of HFC-32; and (iv) 28.2% to 31.1% of HFC-125.

16. The method of claim 13 wherein said liquid refrigerant evaporates in said flooded evaporator at a temperature of from about −65° C. up to and including about 0° C.

17. The method of claim 13 wherein said liquid refrigerant evaporates in said flooded evaporator at a temperature of from about −20° C. up to and including about 20° C.

18. The method of claim 13 wherein said liquid refrigerant evaporates in said flooded evaporator at an average temperature of from about −40° C. to less than about −12° C.

19. The method of claim 13 wherein said liquid refrigerant evaporates in said flooded evaporator at an average temperature of from about −35° C. to about −25° C.

20. The method of claim 13 wherein said compression refrigeration system operates with a capacity in said system that is at least 95% of the capacity of R-22 in said system.

21. The method of claim 20 wherein said compression refrigeration system operates with a power consumption that is 110% or less than the power consumption of R-22 in said system.

22. The method of claim 13 wherein said existing vapor compression system further comprises an accumulator which receives said mixture from said pressure reducer, separates said refrigerant vapor from said liquid refrigerant, and produces a liquid refrigerant stream and a refrigerant vapor stream, wherein said refrigerant vapor from said accumulator feeds said compressor inlet.

* * * * *